US012466354B2

(12) United States Patent
Rosenberg et al.

(10) Patent No.: US 12,466,354 B2
(45) Date of Patent: Nov. 11, 2025

(54) AUTOMATIC SEAT BELT HEIGHT ADJUSTMENT

(71) Applicant: Volvo Car Corporation, Gothenburg (SE)

(72) Inventors: Johan Rosenberg, Gothenburg (SE); Sebastian Rutelin, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 0 days.

(21) Appl. No.: 18/417,354

(22) Filed: Jan. 19, 2024

(65) Prior Publication Data
US 2025/0236257 A1    Jul. 24, 2025

(51) Int. Cl.
*B60R 22/20*    (2006.01)

(52) U.S. Cl.
CPC ........ B60R 22/20 (2013.01); *B60R 2022/208* (2013.01)

(58) Field of Classification Search
CPC .............. B60R 2022/208; B60R 22/20; B60R 2022/485; B60R 21/01552; B60R 21/01544
USPC ....................................................... 280/801.2
See application file for complete search history.

(56) References Cited

U.S. PATENT DOCUMENTS

| | | | |
|---|---|---|---|
| 4,616,850 A * | 10/1986 | Sedlmayr | B60R 22/201 297/483 |
| 4,659,108 A * | 4/1987 | Sack | B60R 22/44 297/474 |
| 6,736,231 B2 * | 5/2004 | Breed | B60N 2/0276 342/72 |
| 7,350,809 B2 * | 4/2008 | Matsuda | G01S 5/163 280/735 |
| 8,523,229 B1 | 9/2013 | Kohlndorfer | |
| 9,919,670 B2 * | 3/2018 | Le | B60R 21/01552 |
| 10,252,694 B2 * | 4/2019 | Lin | G06V 40/11 |
| 10,293,782 B1 | 5/2019 | Schaub et al. | |

(Continued)

FOREIGN PATENT DOCUMENTS

| CN | 110525373 A | 12/2019 |
|---|---|---|
| CN | 110816466 A | 2/2020 |

(Continued)

*Primary Examiner* — Paul N Dickson
*Assistant Examiner* — Caitlin Anne Miller
(74) *Attorney, Agent, or Firm* — Raj S. Dave; Dave Law Group LLC

(57) ABSTRACT

A system is described herein. The system comprises sensor modules; a memory; and a processor storing instructions in the memory that, when executed, causes the processor to: receive data comprising vehicle compartment features, occupant features and external environmental conditions from the sensor modules; determine a current setup of a seat belt and a current posture of an occupant based on the vehicle compartment features and the occupant features, respectively; determine critical features of the occupant based on at least one of the current posture of the occupant, the current setup of the seat belt and the external environment conditions; determine a deviation from the current setup of the seat belt based on at least one of the critical features of the occupant and the external environmental conditions; and communicate a command to actuators for changing a current height of the seat belt to an optimal height according to the deviation.

18 Claims, 11 Drawing Sheets

(56) References Cited

U.S. PATENT DOCUMENTS

| | | | |
|---|---|---|---|
| 11,084,443 B2* | 8/2021 | Hiroki | B60R 21/01544 |
| 11,420,579 B2* | 8/2022 | Baltaxe | B60R 21/01552 |
| 2007/0195990 A1* | 8/2007 | Levy | G06V 10/225 |
| | | | 340/457.1 |
| 2014/0132056 A1 | 5/2014 | Yilma et al. | |
| 2014/0246278 A1 | 9/2014 | Heath | |
| 2021/0331709 A1 | 10/2021 | Kim et al. | |
| 2023/0131504 A1* | 4/2023 | Xu | B60R 21/0134 |
| | | | 701/45 |
| 2023/0168364 A1 | 6/2023 | Podkamien et al. | |
| 2024/0416865 A1* | 12/2024 | Nilsson | B60R 22/48 |

FOREIGN PATENT DOCUMENTS

| | | |
|---|---|---|
| DE | 102006042673 B4 | 7/2009 |
| JP | 2000211478 A | 8/2000 |
| JP | 2019167070 A | 10/2019 |
| KR | 102093797 B1 | 3/2020 |
| WO | 2023068668 A1 | 4/2023 |

\* cited by examiner

AUTOMATIC SEAT BELT HEIGHT ADJUSTMENT

FIELD OF THE INVENTION

The present disclosure relates generally to a field of transportation. More specifically, the present disclosure relates to seat belt height adjustment.

BACKGROUND

By the introduction of more advanced interior sensing capabilities, the vehicle can be able to identify different features in the vehicle compartment such as visual appearance, shape, weight, movement, belt pay out and other parameters. By use of one or more of these monitored parameters, the vehicle can advise the user on safe configuration of, for example, accessories.

It is important for the safety performance during a crash to have a good seat belt geometry. The seat belt geometry for the diagonal belt is controlled by adjusting the height of the upper belt outlet. The users may not always adjust this height to a position that is optimal to them for safety and comfort.

Therefore, there is a long-felt need for a system and method for adjusting seat belt height to provide safety, convenience, and comfort to one or more occupants.

SUMMARY

The following presents a summary to provide a basic understanding of one or more embodiments described herein. This summary is not intended to identify key or critical elements or delineate any scope of the different embodiments and/or any scope of the claims. The sole purpose of the summary is to present some concepts in a simplified form as a prelude to the more detailed description presented herein.

In one or more embodiments described herein, systems, devices, computer-implemented methods, methods, apparatus and/or computer program products are presented that facilitate adjusting height of the seat belt in the vehicles.

In an aspect, a system is described herein. The system comprises one or more sensor modules; a memory, and a processor storing instructions in the memory that, when executed, causes the processor to: receive data comprising vehicle compartment features, occupant features and external environmental conditions from the one or more sensor modules; determine a current setup of a seat belt and a current posture of an occupant based on the vehicle compartment features and the occupant features, respectively; determine one or more critical features of the occupant based on at least one of the current posture of the occupant, the current setup of the seat belt, and the external environmental conditions; determine a deviation from the current setup of the seat belt based on at least one of the one or more critical features of the occupant and the external environmental conditions; and communicate a command to a seat belt adjustment unit for changing a current height of the seat belt to an optimal height according to the deviation.

In an aspect, a method is described herein. The method comprises: receiving data comprising vehicle compartment features, occupant features and external environmental conditions from one or more sensor modules; determining a current setup of a seat belt and a current posture of an occupant based on the vehicle compartment features and the occupant features, respectively; determining one or more critical features of the occupant based on at least one of the current posture of the occupant, the current setup of the seat belt, and the external environmental conditions; determining a deviation from the current setup of the seat belt based on at least one of the one or more critical features of the occupant and the external environmental conditions; and communicating a command to a seat belt adjustment unit for changing a current height of the seat belt to an optimal height according to the deviation.

In another aspect, a non-transitory computer-readable storage medium is described. The non-transitory computer-readable storage medium stores a sequence of instructions, which when executed by a processor causes: receiving data comprising vehicle compartment features, occupant features and external environmental conditions from one or more sensor modules; determining a current setup of a seat belt and a current posture of an occupant based on the vehicle compartment features and the occupant features, respectively; determining one or more critical features of the occupant based on at least one of the current posture of the occupant, the current setup of the seat belt, and the external environmental conditions; determining a deviation from the current setup of the seat belt based on at least one of the one or more critical features of the occupant and the external environmental conditions; and communicating a command to a seat belt adjustment unit for changing a current height of the seat belt to an optimal height according to the deviation.

The methods and systems disclosed herein may be implemented in any means for achieving various aspects and may be executed in a form of a non-transitory machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE FIGURES

These and other aspects of the present disclosure will now be described in more detail, with reference to the appended drawings showing exemplary embodiments, in which.

Figure 1:
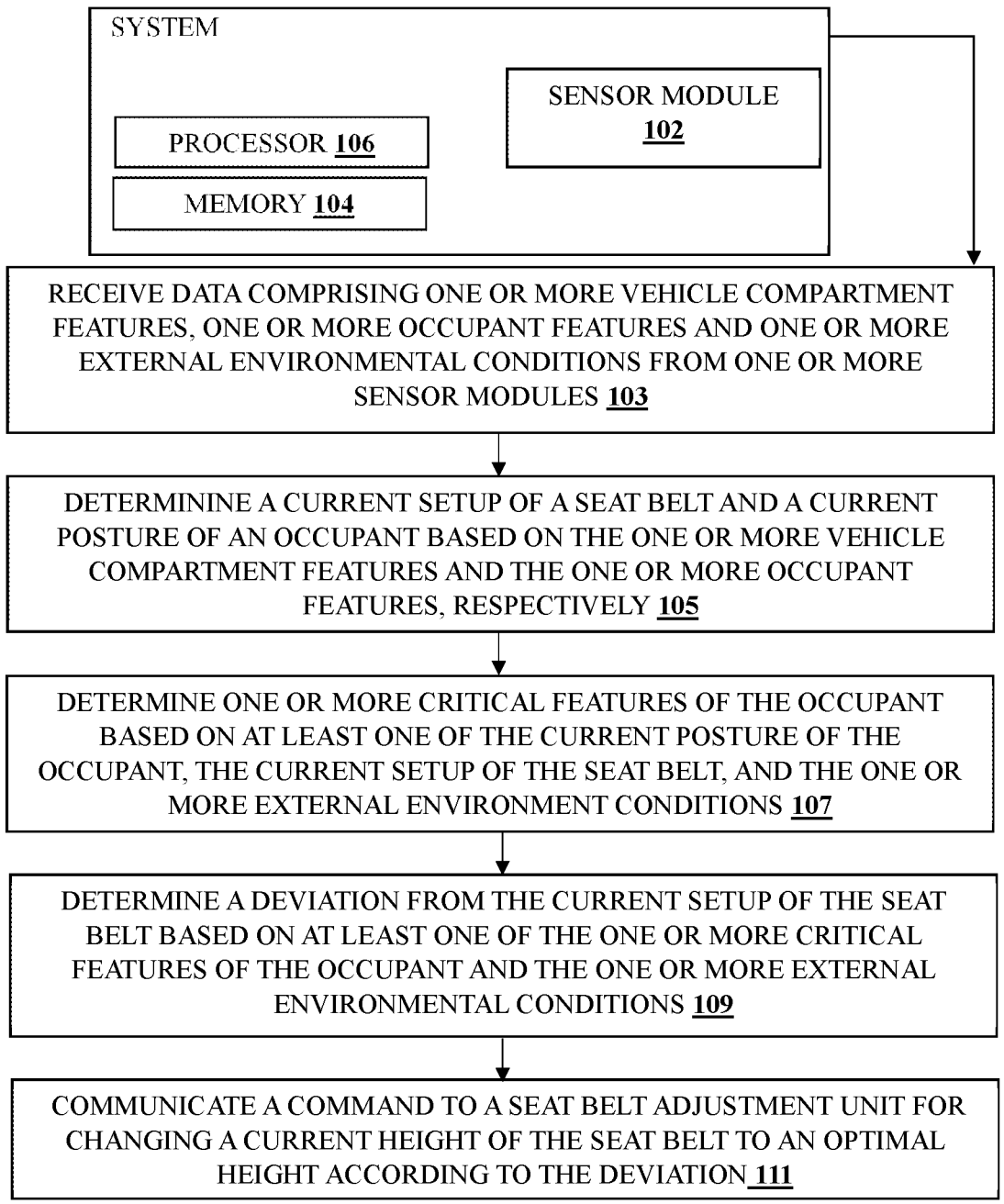
FIG. 1 illustrates a system, according to one or more embodiments.

Other features of the present embodiments will be apparent from the accompanying drawings and from the detailed description that follows.

DETAILED DESCRIPTION

For simplicity and clarity of illustration, the figures illustrate the general manner of construction. The description and figures may omit the descriptions and details of well-known features and techniques to avoid unnecessarily obscuring the present disclosure. The figures exaggerate the dimensions of some of the elements relative to other elements to help improve understanding of embodiments of the present disclosure. The same reference numeral in different figures denotes the same element.

Although the detailed description herein contains many specifics for the purpose of illustration, a person of ordinary skill in the art will appreciate that many variations and alterations to the details are considered to be included herein.

Accordingly, the embodiments herein are without any loss of generality to, and without imposing limitations upon, any claims set forth. The terminology used herein is for the purpose of describing particular embodiments only and is not limiting. Unless defined otherwise, all technical and scientific terms used herein have the same meaning as commonly understood by one with ordinary skill in the art to which this disclosure belongs.

Unless defined otherwise, all technical and scientific terms used herein have the same meaning as commonly understood by one with ordinary skill in the art.

As used herein, the articles "a" and "an" used herein refer to one or to more than one (i.e., to at least one) of the grammatical object of the article. By way of example, "an element" means one element or more than one element. Moreover, usage of articles "a" and "an" in the subject specification and annexed drawings construe to mean "one or more" unless specified otherwise or clear from context to mean a singular form.

As used herein, the terms "example" and/or "exemplary" mean serving as an example, instance, or illustration. For the avoidance of doubt, such examples do not limit the herein described subject matter. In addition, any aspect or design described herein as an "example" and/or "exemplary" is not necessarily preferred or advantageous over other aspects or designs, nor does it preclude equivalent exemplary structures and techniques known to those of ordinary skill in the art.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

As used herein, the terms "left," "right," "front," "back," "top," "bottom," "over," "under" and the like in the description and in the claims, if any, are for descriptive purposes and not necessarily for describing permanent relative positions. The terms so used are interchangeable under appropriate circumstances such that the embodiments of the apparatus, methods, and/or articles of manufacture described herein are, for example, capable of operation in other orientations than those illustrated or otherwise described herein.

No element act, or instruction used herein is critical or essential unless explicitly described as such. Furthermore, the term "set" includes items (e.g., related items, unrelated items, a combination of related items and unrelated items, etc.) and may be interchangeable with "one or more". Where only one item is intended, the term "one" or similar language is used. Also, the terms "has," "have," "having," or the like are open-ended terms. Further, the phrase "based on" means "based, at least in part, on" unless explicitly stated otherwise.

As used herein, the terms "system," "device," "unit," and/or "module" refer to a different component, component portion, or component of the various levels of the order. However, other expressions that achieve the same purpose may replace the terms.

As used herein, the terms "couple," "coupled," "couples," "coupling," and the like refer to connecting two or more elements mechanically, electrically, and/or otherwise. Two or more electrical elements may be electrically coupled together, but not mechanically or otherwise coupled together. Coupling may be for any length of time, e.g., permanent, or semi-permanent or only for an instant. "Electrical coupling" includes electrical coupling of all types. The absence of the word "removably," "removable," and the like, near the word "coupled" and the like does not mean that the coupling, etc. in question is or is not removable.

As used herein, the term "or" means an inclusive "or" rather than an exclusive "or." That is, unless specified otherwise, or clear from context. "X employs A or B" means any of the natural inclusive permutations. That is, if X employs A; X employs B; or X employs both A and B, then "X employs A or B" is satisfied under any of the foregoing instances.

As used herein, two or more elements or modules are "integral" or "integrated" if they operate functionally together. Two or more elements are "non-integral" if each element can operate functionally independently.

As used herein, the term "real-time" refers to operations conducted as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As used herein, the term "approximately" can mean within a specified or unspecified range of the specified or unspecified stated value. In some embodiments, "approximately" can mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Digital electronic circuitry, or in computer software, firmware, or hardware, including the structures disclosed in this specification and their structural equivalents, or in combinations of one or more of them may realize the implementations and all of the functional operations described in this specification. Implementations may be as one or more computer program products, i.e., one or more modules of computer program instructions encoded on a computer-readable storage medium for execution by, or to control the operation of, data processing apparatus. The computer-readable storage medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that encodes information for transmission to a suitable receiver apparatus.

The actual specialized control hardware or software code used to implement these systems and/or methods is not limiting to the implementations. Thus, any software and any hardware can implement the systems and/or methods based on the description herein without reference to specific software code.

A computer program (also known as a program, software, software application, script, or code) is written in any appropriate form of programming language, including compiled or interpreted languages. Any appropriate form, including a standalone program or a module, component, subroutine, or other unit suitable for use in a computing environment may deploy it. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may execute on one computer or on multiple computers that are located at one site or distributed across multiple sites and interconnected by a communication network.

One or more programmable processors, executing one or more computer programs to perform functions by operating on input data and generating output, perform the processes and logic flows described in this specification. The processes and logic flows may also be performed by, and apparatus may also be implemented as, special purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of a digital computer. A processor will receive instructions and data from a read-only memory or a random-access memory or both. Elements of a computer can include a processor for performing instructions and one or more memory devices for storing instructions and data. A computer will also include, or is operatively coupled to receive data, transfer data or both, to/from one or more mass storage devices for storing data e.g., magnetic disks, magneto optical disks, optical disks, or solid-state disks. However, a computer need not have such devices. Moreover, another device, e.g., a mobile telephone, a personal digital assistant (PDA), a mobile audio player, a Global Positioning System (GPS) receiver, etc. may embed a computer. Computer-readable media suitable for storing computer program instructions and data include all forms of non-volatile memory, media and memory devices, including, by way of example, semiconductor memory devices (e.g., Erasable Programmable e.g., -Only Memory (EPROM), Electronically Erasable Programmable Read-Only Memory (EEPROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. Special purpose logic circuitry may supplement or incorporate the processor and the memory.

To provide for interaction with a user, a computer may have a display device, e.g., a Cathode Ray Tube (CRT) or Liquid Crystal Display (LCD) monitor, for displaying information to the user, and a keyboard and a pointing device, e.g., a mouse or a trackball, by which the user may provide input to the computer. Other kinds of devices provide for interaction with a user as well. For example, feedback to the user may be any appropriate form of sensory feedback, e.g., visual feedback, auditory feedback, or tactile feedback; and a computer may receive input from the user in any appropriate form, including acoustic, speech, or tactile input.

A computing system that includes a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components, may realize implementations described herein. Any appropriate form or medium of digital data communication, e.g., a communication network may interconnect the components of the system. Examples of communication networks include a Local Area Network (LAN) and a Wide Area Network (WAN), e.g., Intranet and Internet.

The computing system may include clients and servers. A client and server are remote from each other and typically interact through a communication network. The relationship of the client and server arises by virtue of computer programs running on the respective computers and having a client-server relationship to each other.

Embodiments may comprise or utilize a special purpose or general purpose computer including computer hardware. Embodiments within the scope of the present invention may also include physical and other computer-readable media for carrying or storing computer-executable instructions and/or data structures. Such computer-readable media can be any media accessible by a general purpose or special purpose computer system. Computer-readable media that store computer-executable instructions are physical storage media. Computer-readable media that carry computer-executable instructions are transmission media. Thus, by way of example and not limitation, embodiments of the invention can comprise at least two distinct kinds of computer-readable media: physical computer-readable storage media and transmission computer-readable media.

Although the present embodiments described herein are with reference to specific example embodiments it will be evident that various modifications and changes may be made to these embodiments without departing from the broader spirit and scope of the various embodiments. For example, hardware circuitry (e.g., Complementary Metal Oxide Semiconductor (CMOS) based logic circuitry), firmware, software (e.g., embodied in a non-transitory machine-readable medium), or any combination of hardware, firmware, and software may enable and operate the various devices, units, and modules described herein. For example, transistors, logic gates, and electrical circuits (e.g., Application Specific Integrated Circuit (ASIC) and/or Digital Signal Processor (DSP) circuit) may embody the various electrical structures and methods.

In addition, a non-transitory machine-readable medium and/or a system may embody the various operations, processes, and methods disclosed herein. Accordingly, the specification and drawings are illustrative rather than restrictive.

Physical computer-readable storage media includes RAM, ROM, EEPROM, CD-ROM or other optical disk storage (such as CDs, DVDs, etc.), magnetic disk storage or other magnetic storage devices, solid-state disks or any other medium. They store desired program code in the form of computer-executable instructions or data structures which can be accessed by a general purpose or special purpose computer.

As used herein, the term "network" refers to one or more data links that enable the transport of electronic data between computer systems and/or modules and/or other electronic devices. When a network or another communications connection (either hardwired, wireless, or a combination of hardwired or wireless) transfers or provides information to a computer, the computer properly views the connection as a transmission medium. A general purpose or special purpose computer access transmission media that can include a network and/or data links which carry desired program code in the form of computer-executable instructions or data structures. The scope of computer-readable media includes combinations of the above, that enable the transport of electronic data between computer systems and/or modules and/or other electronic devices.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a Network Interface Module (NIC), and then eventually transferred to computer system RAM and/or to less volatile computer-readable physical storage media at a computer system. Thus, computer system components that also (or even primarily) utilize transmission media may include computer-readable physical storage media.

Computer-executable instructions comprise, for example, instructions and data which cause a general purpose computer, special purpose computer, or special purpose processing device to perform a certain function or group of functions. The computer-executable instructions may be, for example, binary, intermediate format instructions such as assembly language, or even source code. Although the subject matter herein described is in a language specific to structural features and/or methodological acts, the described features or acts described do not limit the subject matter defined in the claims. Rather, the herein described features and acts are example forms of implementing the claims.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable sub-combination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Similarly, while operations depicted herein in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may be integrated together in a single software product or packaged into multiple software products.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

Further, a computer system including one or more processors and computer-readable media such as computer memory may practice the methods. In particular, one or more processors execute computer-executable instructions, stored in the computer memory, to perform various functions such as the acts recited in the embodiments.

Those skilled in the art will appreciate that the invention may be practiced in network computing environments with many types of computer system configurations including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. Distributed system environments where local and remote computer systems, which are linked (either by hardwired data links, wireless data links, or by a combination of hardwired and wireless data links) through a network, both perform tasks may also practice the invention. In a distributed system environment, program modules may be located in both local and remote memory storage devices.

The following terms and phrases, unless otherwise indicated, shall have the following meanings.

As used herein, the term "sensor module" refers to a unit that contains components or circuits in addition to the sensors. The additional components or circuits make the sensor easy to use. The sensor module may be an integrated circuit comprising additional components and sensors adaptable for an application. The sensor module may comprise one or more sensors that operate functionally together. For example, the one or more cameras and the one or more sensors within the sensor module are integrated with one another to route the seat belt (e.g., adjust the height of the seat belt outlet) with safety, comfort, and convenience to the one or more occupants. For example, the sensors within the sensor module operate in an integrated manner to monitor the facial expressions of the one or more occupants with respect to change in the height of the one or more seat belt outlets.

As used herein, the term "occupant" refers to a person seated in the vehicle. The occupant is one of a child, a kid, an adult, and an aged person. The occupant may be a driver, a passenger, etc.

As used herein, the term "mounted external" refers to mounting one or more components external to the vehicles without any physical contact to the vehicle.

As used herein, the term "mounted onto" refers to mounting one or more components onto the surface of the vehicles. The one or more components are in physical contact to the vehicle.

As used herein, the term "occupant seat" refers to a seat in the vehicle. The occupant seat may be a seat in the interior of the vehicle. The occupant seat may also be a child safety seat. The occupant seat may also be a seat integrated within the vehicle. The occupant seat may be a driver seat or passenger seat. The occupant seat may comprise a reclining seat or a non-reclining seat. The occupant seat may be a mechanical operated seat or an electronic operated seat.

As used herein, the term "facial expression" refers to an expression provided by the occupant. The facial expression may refer to a response from the user upon fastening or changing the height of the seat belt. For example, the occupant may provide a smiling expression when the height of the seat belt is adjusted with uttermost convenience. The occupant may also provide a painful expression when the seat belt is adjusted with uttermost tautness that might put pressure or stress on the muscles or body parts of the occupant.

As used herein, the term "interior" refers to one or more inner portions of the vehicle. The term "interior" further refers to one or more portions within the vehicle.

As used herein, the term "seat belt" refers to a strap that is fixed to the seat in a vehicle and that the occupant wears around his/her body so that the occupant is not thrown forward if there is an accident. The seat belt protects the occupant's life from injury and/or death. The seat belt is an arrangement of straps designed to hold a person steady in a seat. The seat belt may be wound over the occupant to hold the person steady. The seat belt may comprise a buckle at one end to fasten or lock the seat belt. The seat belt may also comprise other means at one end to fasten or lock the seat belt. The seat belt may comprise a shoulder belt and waist belt.

As used herein, the term "seat belt adjustment unit" refers to a device for adjusting the height of the seat belt as per the requirement of the individual wearer and to the position of the seat. The seat belt adjustment unit comprises an electric reversible retractor (ERR). The "seat belt adjustment unit" may be used to adjust the height of the seat belt with safety, comfort, and convenience to the occupants. The seat belt adjustment unit is adapted to adjust the height of the seat belt automatically and manually in an integrated manner. By getting support from the seat belt adjustment unit for tightening the seat belt, a correct seat installation is easily achieved. The seat belt adjustment unit may comprise actuators.

As used herein, the term "electronic unit" refers to a device integrated within the vehicle (e.g., infotainment unit, computing unit with dashboard in the vehicle). The term "electronic unit" refers to a device external to the vehicle (e.g., occupant's smartphone, tablet, computer, laptop, etc.). The electronic unit enables the user to interact with the system and the vehicle. The electronic unit renders a user interface to provide user input regarding adjusting the tautness of the seat belt.

As used herein, the term "occupant feature" refers to parameters or characteristics of the occupants. The occupant features comprise at least one of one or more facial expressions, occupant size, occupant shape, occupant seating postures, occupant dimensions, and occupant weight. The occupant feature may also refer to a boundary or an outline of the occupant. The outline may depict a layout/structure/shape of body parts of the occupant.

As used herein, the term "body parts" refers to a part of the occupant body. The body part may be one of limb, extremity, an organ, a finger, a leg, an internal part, an external part, etc. The body part may also refer to external protrusions from the body.

As used herein, the term "posture" refers to the position or bearing of the body whether characteristic or assumed for a special purpose. The term "posture" may refer to alignment of the body and its segments in certain positions. Examples include sitting, relaxing, and sitting cross-legged, etc.

As used herein, the term "reclining" refers to sitting or lying back in a relaxed and comfortable way. The term "reclining" refers to a position to lean or lie back with the upper part of your body in a nearly horizontal position. The occupant seat may recline to a predefined angle enabling the occupant to lean back.

As used herein, the term "buckle" refers to a device attached to the seat belt for fastening or locking the seat belt. The buckle may refer to a fastening socket for locking the seat belt to an appropriate position.

As used herein, the term "route a seat belt" refers to wearing the seat belt over the occupant and fastening it.

As used herein, the term "guiding element" refers to an element that guides the seat belt along a predefined path to route the seat belt over the occupant. The guiding element may comprise a channel like structure that provides the predefined path to route the seat belt. The guiding element may be detached after fastening the seat belt.

As used herein, the term "external environmental condition" refers to a condition external to the vehicle. The external environmental condition may impact the mobility of the vehicle. The external environmental condition may also impact the visibility outside the vehicle so that the user may adjust the height of the occupant seat and accordingly the height of the seat belt. The external environmental conditions comprises information of at least one of a weather, a climate, a temperature, a wind, a storm, a tornado, a snow, a sleet, a rain, a fog, a road surface condition, and a traffic condition. The road surface condition may be smooth or uneven surface. The road surface condition may also refer to roads having potholes. The road surface condition may also refer to icy roads or slippery roads or bouncy roads, etc.

As used herein, the term "critical features" refers to features or parameters that are essential for calculating the deviation in the height of the seat belt. The critical features may be features that are specific to an occupant which differs from rest of them. The critical features are adapted to ensure the seat belt positioning or routing appropriately over the occupant ensuring safety to the occupant.

As used herein, the term "deviation" refers to a variation in setup that is different from the current setup of the seat belt (seat belt outlet). The deviation may comprise at least one of recline deviation, seat height deviation and seat belt outlet deviation.

As used herein, the term "vehicle compartment features" refers to interior portion of the vehicle encompassing the occupant seat, windshield, occupant, etc.

As used herein, the term "reference point" refers to a basis or standard for evaluation, assessment, or comparison; a criterion for calculating and adjusting the height of the seat belt. The reference points may be physical points.

As used herein, the term "occupant weight" refers to a force acting on the occupant due to acceleration or gravity.

As used herein, the term "seat height deviation" refers to a variation in seat height when compared to the current setup of the seat height.

As used herein, the term "seat belt deviation" refers to a variation in routing of the seat belt over the occupant when compared to the current routing of the seat belt.

As used herein, the term "recline deviation" refers to a variation in reclining of the occupant seat when compared to the current reclining angle of the occupant seat.

As used herein, the term "cryptographic protocol" is also known as security protocol or encryption protocol. It is an abstract or concrete protocol that performs a security-related function and applies cryptographic methods often as sequences of cryptographic primitives. A protocol describes usage of the algorithms. A sufficiently detailed protocol includes details about data structures and representations, to implement multiple, interoperable versions of a program. Cryptographic protocols are widely used for secure application-level data transport. A cryptographic protocol usually incorporates at least some of these aspects: key agreement or establishment, entity authentication, symmetric encryption, and message authentication, secured application-level data transport, non-repudiation methods, secret sharing methods, and secure multi-party computation. Hashing algorithms may be used to verify the integrity of data. Secure Socket Layer (SSL) and Transport Layer Security (TLS), the successor to SSL, are cryptographic protocols that may be used by networking switches to secure data communications over a network. Secure application-level data transport widely uses cryptographic protocols. A cryptographic protocol usually incorporates at least some of these aspects: key agreement or establishment, entity authentication, symmetric encryption, and message authentication material construction, secured application-level data transport, non-repudiation methods, secret sharing methods, and secure multi-party computation.

Networking switches use cryptographic protocols, like Secure Socket Layer (SSL) and Transport Layer Security (TLS), the successor to SSL, to secure data communications over a wireless network.

As used herein, the term "unauthorized access" is when someone gains access to a website, program, server, service, or other system using someone else's account or other methods. For example, if someone kept guessing a password or username for an account that was not theirs until they gained access, it is considered unauthorized access.

As used herein, the term "IoT" stands for Internet of Things which describes the network of physical objects "things" or objects embedded with sensors, software, and other technologies for the purpose of connecting and exchanging data with other devices and systems over the internet.

As used herein "machine learning" refers to algorithms that give a computer the ability to learn without being explicitly programmed, including algorithms that learn from and make predictions about data. Machine learning techniques include, but are not limited to, and support vector machine, artificial neural network (ANN) (also referred to herein as a "neural net"), deep learning neural network, logistic regression, discriminant analysis, random forest, linear regression, rules-based machine learning, Naive Bayes, nearest neighbor, decision tree, decision tree learning, and hidden Markov, etc. For the purposes of clarity, algorithms such as linear regression or logistic regression can also be used as part of a machine learning process. However, it is understood that using linear regression or another algorithm as part of a machine learning process is distinct from performing a statistical analysis such as regression with a spreadsheet program. The machine learning process can continually learn and adjust the classifier as new data becomes available and does not rely on explicit or rules-based programming. The ANN may be featured with a feedback loop to adjust the system output dynamically as it learns from the new data as it becomes available. In machine learning, backpropagation and feedback loops are used to train the AI/ML model improving the model's accuracy and performance over time.

As used herein, the term "Dashboard" is a type of interface that visualizes particular Key Performance Indicators (KPIs) for a specific goal or process. It is based on data visualization and infographics.

As used herein, a "Database" is a collection of organized information so that it can be easily accessed, managed, and updated. Computer databases typically contain aggregations of data records or files.

As used herein, the term "Data set" (or "Dataset") is a collection of data. In the case of tabular data, a data set corresponds to one or more database tables, where every column of a table represents a particular variable, and each row corresponds to a given record of the data set in question. The data set lists values for each of the variables, such as height and weight of an object, for each member of the data set. Each value is known as a datum. Data sets can also consist of a collection of documents or files.

As used herein, a "Sensor" is a device that detects and measures physical properties from the surrounding environment and converts this information into electrical or digital signals for further processing. Sensors play a crucial role in collecting data for various applications across industries. Sensors may be made of electronic, mechanical, chemical, or other engineering components. Examples include sensors to measure temperature, pressure, humidity, proximity, light, acceleration, orientation etc.

In an embodiment, sensors may be removably or fixedly installed within the vehicle and may be disposed in various arrangements to provide information to the autonomous operation features. The sensors may include one or more of a GPS unit, a radar unit, a LIDAR unit, an ultrasonic sensor, an infrared sensor, an inductance sensor, a camera, an accelerometer, a tachometer, a tension sensor, or a speedometer. Some of the sensors (e.g., radar, LIDAR, or camera units) may actively or passively scan the interior of the vehicle for the presence of occupants (e.g., child, adult, kids, passenger, driver, etc.). Other sensors (e.g., accelerometer, or tachometer units) may provide data for determining the rotational speed of the motors or actuators engaged with the seat belt for determining tautness of the seat belt. Tension sensors may determine the tautness of the seat belt by converting force or weight into an electrical signal.

The term "vehicle" as used herein refers to a thing used for transporting people or goods. Automobiles, cars, trucks, buses, etc., are examples of vehicles.

The term "electronic control unit" (ECU), also known as an "electronic control module" (ECM), is usually a module that controls one or more subsystems. Herein, an ECU may be installed in a car or other motor vehicle. It may refer to many ECUs, and can include but not limited to, Engine Control Module (ECM), Powertrain Control Module (PCM), Transmission Control Module (TCM), Brake Control Module (BCM) or Electronic Brake Control Module (EBCM), Central Control Module (CCM), Central Timing Module (CTM), General Electronic Module (GEM), Body Control Module (BCM), and Suspension Control Module (SCM). ECUs together are sometimes referred to collectively as the vehicles' computer or vehicles' central computer and may include separate computers. In an example, the electronic control unit can be an embedded system in automotive electronics. In another example, the electronic control unit is wirelessly coupled with the automotive electronics.

The terms "non-transitory computer-readable storage medium" and "computer-readable storage medium" include a single medium or multiple media such as a centralized or distributed database, and/or associated caches and servers that store one or more sets of instructions. Further, the terms "non-transitory computer-readable storage medium" and "computer-readable storage medium" include any tangible medium that is capable of storing, encoding, or carrying a set of instructions for execution by a processor that, for example, when executed, cause a system to perform any one or more of the methods or operations disclosed herein. As used herein, the term "computer-readable storage medium" is expressly defined to include any type of computer-readable storage device and/or storage disk and to exclude propagating signals.

The term "vehicle data bus" as used herein represents the interface to the vehicle data bus (e.g., CAN, LIN, Ethernet/IP, FlexRay, and MOST) that may enable communication between the Vehicle on-board equipment (OBE) and other vehicle systems to support connected vehicle applications.

The term, "handshaking" refers to an exchange of predetermined signals between agents connected by a communications channel to assure each that it is connected to the other (and not to an imposter). This may also include the use of passwords and codes by an operator. Handshaking signals are transmitted back and forth over a communications network to establish a valid connection between two stations. A hardware handshake uses dedicated wires such as the request-to-send (RTS) and clear-to-send (CTS) lines in an RS-232 serial transmission. A software handshake sends codes such as "synchronize" (SYN) and "acknowledge" (ACK) in a TCP/IP transmission.

The term "infotainment system" or "in-vehicle infotainment system" (IVI) as used herein refers to a combination of vehicle systems which are used to deliver entertainment and information. In an example, the information may be delivered to the driver and the passengers of a vehicle/occupants through audio/video interfaces, control elements like touch screen displays, button panel, voice commands, and more. Some of the main components of an in-vehicle infotainment systems are integrated head-unit, heads-up display, high-end Digital Signal Processors (DSPs), and Graphics Processing Units (GPUs) to support multiple displays, operating systems, Controller Area Network (CAN), Low-Voltage Differential Signaling (LVDS), and other network protocol support (as per the requirement), connectivity modules, automotive sensors integration, digital instrument cluster, etc.

The term "autonomous mode" as used herein refers to an operating mode which is independent and unsupervised.

The term "autonomous communication" as used herein comprises communication over a period with minimal supervision under different scenarios and is not solely or completely based on pre-coded scenarios or pre-coded rules or a predefined protocol. Autonomous communication, in general, happens in an independent and an unsupervised manner. In an embodiment, a communication module is enabled for autonomous communication.

The term "communication system" or "communication module" as used herein refers to a system which enables the information exchange between two points. The process of transmission and reception of information is called communication. The major elements of communication include but are not limited to a transmitter of information, channel or medium of communication and a receiver of information.

The term "connection" as used herein refers to a communication link. It refers to a communication channel that connects two or more devices for the purpose of data transmission. It may refer to a physical transmission medium such as a wire, or to a logical connection over a multiplexed medium such as a radio channel in telecommunications and computer networking. A channel is used for the information transfer of, for example, a digital bit stream, from one or several senders to one or several receivers. A channel has a certain capacity for transmitting information, often measured by its bandwidth in Hertz (Hz) or its data rate in bits per second. For example, a Vehicle-to-Vehicle (V2V) communication may wirelessly exchange information about the speed, location and heading of surrounding vehicles.

The term "communication" as used herein refers to the transmission of information and/or data from one point to another. Communication may be by means of electromagnetic waves. It is also a flow of information from one point, known as the source, to another, the receiver. Communication comprises one of the following: transmitting data, instructions, and information or a combination of data, instructions, and information. Communication happens between any two communication systems or communicating units. The term "in communication with" may refer to any coupling, connection, or interaction using electrical signals to exchange information or data, using any system, hardware, software, protocol, or format, regardless of whether the exchange occurs wirelessly or over a wired connection.

The term communication includes systems that combine other more specific types of communication, such as V2I (Vehicle-to-Infrastructure), V2I (Vehicle-to-Infrastructure), V2N (Vehicle-to-Network), V2V (Vehicle-to-Vehicle), V2P (Vehicle-to-Pedestrian), V2D (Vehicle-to-Device) and V2G (Vehicle-to-Grid) and Vehicle-to-Everything (V2X) communication.

Further, the communication apparatus is configured on a computer with the communication function and is connected for bidirectional communication with the on-vehicle emergency report apparatus by a communication line through a radio station and a communication network such as a public telephone network or by satellite communication through a communication satellite. The communication apparatus is adapted to communicate, through the communication network, with communication terminals.

The term "communication protocol" as used herein refers to standardized communication between any two systems. An example communication protocol is a DSRC protocol. The DSRC protocol uses a specific frequency band (e.g., 5.9 GHZ) and specific message formats (such as the Basic Safety Message, Signal Phase and Timing, and Roadside Alert) to enable communications between vehicles and infrastructure components, such as traffic signals and roadside sensors. DSRC is a standardized protocol, and its specifications are maintained by various organizations, including the IEEE and SAE International.

The term "alert" or "alert signal" refers to a communication to attract attention. An alert may include visual, tactile, audible alert, and a combination of these alerts to warn drivers or occupants. These alerts allow receivers, such as drivers or occupants, the ability to react and respond quickly.

As used herein, the term "video analytics" refers to a practical solution for reviewing hours of video (e.g., surveillance video) to identify incidents that are pertinent to what you are looking for. Video analytics is adapted to automatically generate descriptions of what is actually happening in the video (so-called metadata), which can be used to list occupants, seat belt and other objects detected in the video stream (e.g., fastened seat belt, presence of an occupant, postures, gestures, etc.), as well as their appearance and movements.

As used herein, the term "region of interest" refers to a portion of an image that you want to filter or operate on in some way. The region of interest (often abbreviated ROI) is a sample within a data set identified for a particular purpose.

The term "cyber security" as used herein refers to application of technologies, processes, and controls to protect systems, networks, programs, devices, and data from cyber-attacks.

The term "cyber security module" as used herein refers to a module comprising application of technologies, processes, and controls to protect systems, networks, programs, devices and data from cyber-attacks and threats. It aims to reduce the risk of cyber-attacks and protect against the unauthorized exploitation of systems, networks, and technologies. It includes, but is not limited to, critical infrastructure security, application security, network security, cloud security, Internet of Things (IoT) security.

The term "encrypt" used herein refers to securing digital data using one or more mathematical techniques, along with a password or "key" used to decrypt the information. It refers to converting information or data into a code, especially to prevent unauthorized access. It may also refer to concealing information or data by converting it into a code. It may also be referred to as cipher, code, encipher, encode. A simple example is representing alphabets with numbers-say, 'A' is '01', 'B' is '02', and so on. For example, a message like "HELLO" will be encrypted as "0805121215," and this value will be transmitted over the network to the recipient(s).

The term "decrypt" used herein refers to the process of converting an encrypted message back to its original format. It is generally a reverse process of encryption. It decodes the encrypted information so that only an authorized user can decrypt the data because decryption requires a secret key or password. This term could be used to describe a method of unencrypting the data manually or unencrypting the data using the proper codes or keys.

The term "cyber security threat" used herein refers to any possible malicious attack that seeks to unlawfully access data, disrupt digital operations, or damage information. A malicious act includes but is not limited to damaging data, stealing data, or disrupting digital life in general. Cyber threats include, but are not limited to, malware, spyware, phishing attacks, ransomware, zero-day exploits, trojans, advanced persistent threats, wiper attacks, data manipulation, data destruction, rogue software, malvertising, unpatched software, computer viruses, man-in-the-middle attacks, data breaches, Denial of Service (DoS) attacks, and other attack vectors.

The term "hash value" used herein can be thought of as fingerprints for files. The contents of a file are processed through a cryptographic algorithm, and a unique numerical value, the hash value, is produced that identifies the contents of the file. If the contents are modified in any way, the value of the hash will also change significantly. Example algorithms used to produce hash values: the Message Digest-5 (MD5) algorithm and Secure Hash Algorithm-1 (SHA1).

The term "integrity check" as used herein refers to the checking for accuracy and consistency of system related files, data, etc. It may be performed using checking tools that can detect whether any critical system files have been changed, thus enabling the system administrator to look for unauthorized alteration of the system. For example, data integrity corresponds to the quality of data in the databases and to the level by which users examine data quality, integrity, and reliability. Data integrity checks verify that the data in the database is accurate, and functions as expected within a given application.

The term "alarm" as used herein refers to a trigger when a component in a system or the system fails or does not perform as expected. The system may enter an alarm state when a certain event occurs. An alarm indication signal is a visual signal to indicate the alarm state. For example, when a cyber security threat is detected, a system administrator may be alerted via sound alarm, a message, a glowing LED, a pop-up window, etc. Alarm indication signal may be reported downstream from a detecting device, to prevent adverse situations or cascading effects.

The term "in communication with" as used herein, refers to any coupling, connection, or interaction using signals to exchange information, message, instruction, command, and/or data, using any system, hardware, software, protocol, or format regardless of whether the exchange occurs wirelessly or over a wired connection.

As used herein, the term "cryptographic protocol" is also known as security protocol or encryption protocol. It is an abstract or concrete protocol that performs a security-related function and applies cryptographic methods often as sequences of cryptographic primitives. A protocol describes how the algorithms should be used. A sufficiently detailed protocol includes details about data structures and representations, at which point it can be used to implement multiple, interoperable versions of a program. Cryptographic protocols are widely used for secure application-level data transport. A cryptographic protocol usually incorporates at least some of these aspects: key agreement or establishment, entity authentication, symmetric encryption, and message authentication material construction, secured application-level data transport, non-repudiation methods, secret sharing methods, and secure multi-party computation. Hashing algorithms may be used to verify the integrity of data. Secure Socket Layer (SSL) and Transport Layer Security (TLS), the successor to SSL, are cryptographic protocols that may be used by networking switches to secure data communications over a network.

As used herein, the term "network" may include the Internet, a local area network, a wide area network, or combinations thereof. The network may include one or more networks or communication systems, such as the Internet, the telephone system, satellite networks, cable television networks, and various other private and public networks. In addition, the connections may include wired connections (such as wires, cables, fiber optic lines, etc.), wireless connections, or combinations thereof. Furthermore, although not shown, other computers, systems, devices, and networks may also be connected to the network. Network refers to any set of devices or subsystems connected by links joining (directly or indirectly) a set of terminal nodes sharing resources located on or provided by network nodes. The computers use common communication protocols over digital interconnections to communicate with each other. For example, subsystems may comprise the cloud. Cloud refers to servers that are accessed over the Internet, and the software and databases that run on those servers.

The term "autonomous vehicle" also referred to as self-driving vehicle, driverless vehicle, robotic vehicle as used herein refers to a vehicle incorporating vehicular automation, that is, a ground vehicle that can sense its environment and move safely with little or no human input. Self-driving vehicles combine a variety of sensors to perceive their surroundings, such as thermographic cameras, Radio Detection and Ranging (radar), Light Detection and Ranging (lidar), Sound Navigation and Ranging (sonar), Global Positioning System (GPS), odometry and inertial measurement unit. Control systems, designed for the purpose, interpret sensor information to identify appropriate navigation paths, as well as obstacles and relevant signage.

As used herein, the term "semi-autonomous vehicle" refers to vehicles that can operate for extended periods with little human input. A semi-autonomous vehicle cannot drive itself at all times, but does automate some driving functions under ideal conditions like highway driving. A semi-autonomous vehicle may use "autopilot" features. In one embodiment, semi-autonomous vehicles may be able to keep in lane, and they may also be able to park themselves, but they are not self-driving. The semi-autonomous vehicles act independently to some degree.

As used herein the term "connection" as used herein refers to a communication link. It refers to a communication channel that connects two or more devices for the purpose of data transmission. It may refer to a physical transmission medium such as a wire, or to a logical connection over a multiplexed medium such as a radio channel in telecommunications and computer networking. A channel is used for information transfer of, for example a digital bit stream, from one or several senders to one or several receivers. A channel has a certain capacity for transmitting information, often measured by its bandwidth in Hertz (Hz) or its data rate in bits per second. For example, a Vehicle-to-Vehicle (V2V) communication may wirelessly exchange information about the speed, location and heading of surrounding vehicles.

As used herein, the term "communication" refers to the transmission of information and/or data from one point to another. Communication may be by means of electromagnetic waves. It is also a flow of information from one point, known as the source, to another, the receiver. Communication comprises one of the following: transmitting data, instructions, and information or a combination of data, instructions, and information. Communication happens between any two communication systems or communicating units.

The term "in communication with" may refer to any coupling, connection, or interaction using electrical signals to exchange information or data, using any system, hardware, software, protocol, or format, regardless of whether the exchange occurs wirelessly or over a wired connection. The term communication includes systems that combine other more-specific types of communication, such as V2I (Vehicle-to-Infrastructure), V2I (Vehicle-to-Infrastructure), V2N (Vehicle-to-Network), V2V (Vehicle-to-Vehicle), V2P (Vehicle-to-Pedestrian), V2D (Vehicle-to-Device) and V2G (Vehicle-to-Grid) and Vehicle-to-Everything (V2X) communication. V2X communication is the transmission of information from a vehicle to any entity that may affect the vehicle, and vice versa. The main motivations for developing V2X are occupant safety, road safety, traffic efficiency and energy efficiency. Depending on the underlying technology employed, there are two types of V2X communication technologies: cellular networks and other technologies that support direct device-to-device communication (such as Dedicated Short-Range Communication (DSRC), Port Community System (PCS), Bluetooth®, Wi-Fi®, etc.).

The term "protocol" as used herein refers to a procedure required to initiate and maintain communication; a formal set of conventions governing the format and relative timing of message exchange between two communications terminals; a set of conventions that govern the interaction of processes, devices, and other components within a system; a set of signaling rules used to convey information or commands between boards connected to the bus; a set of signaling rules used to convey information between agents; a set of semantic and syntactic rules that determine the behavior of entities that interact; a set of rules and formats (semantic and syntactic) that determines the communication behavior of simulation applications; a set of conventions or rules that govern the interactions of processes or applications within a computer system or network; a formal set of conventions governing the format and relative timing of message exchange in a computer system; a set of semantic and syntactic rules that determine the behavior of functional units in achieving meaningful communication; a set of semantic and syntactic rules for exchanging information.

The term "communication protocol" as used herein refers to standardized communication between any two systems. An example of a communication protocol is Health Level Seven (HL7). HL7 is a set of international standards used to provide guidance with transferring and sharing data between various healthcare providers. HL7 is a comprehensive framework for the exchange, integration, sharing, and retrieval of health information.

As used herein, the term "component" broadly construes hardware, firmware, and/or a combination of hardware, firmware, and software.

The embodiments described herein can be directed to one or more of a system, a method, an apparatus, and/or a computer program product at any possible technical detail level of integration. The computer program product can include a computer-readable storage medium (or media) having computer-readable program instructions thereon for causing a processor to carry out aspects of the one or more embodiments described herein. The computer-readable storage medium can be a tangible device that can retain and store instructions for use by an instruction execution device. For example, the computer-readable storage medium can be, but is not limited to, an electronic storage device, a magnetic storage device, an optical storage device, an electromagnetic storage device, a superconducting storage device, and/or any suitable combination of the foregoing. A non-exhaustive list of more specific examples of the computer-readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer-readable storage medium, as used herein, does not construe transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer-readable program instructions described herein are downloadable to respective computing/processing devices from a computer-readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device. Computer-readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer-readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer-readable program instructions by utilizing state information of the computer-readable program instructions to personalize the electronic circuitry, in order to perform aspects of the one or more embodiments described herein. Aspects of the one or more embodiments described herein are described with reference to flowchart illustrations and/or block diagrams of methods, apparatus (systems), and computer program products according to one or more embodiments described herein. Each block of the flowchart illustrations and/or block diagrams, and combinations of blocks in the flowchart illustrations and/or block diagrams, can be implemented by computer-readable program instructions. These computer-readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer-readable program instructions can also be stored in a computer-readable storage medium that can direct a computer, a programmable data processing apparatus and/or other devices to function in a particular manner, such that the computer-readable storage medium having instructions stored therein can comprise an article of manufacture including instructions which can implement aspects of the function/act specified in the flowchart and/or block diagram block or blocks. The computer-readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter described herein is in the general context of computer-executable instructions of a computer program product that runs on a computer and/or computers, those skilled in the art will recognize that the one or more embodiments herein also can be implemented in combination with one or more other program modules. Program modules include routines, programs, components, data structures, and/or the like that perform particular tasks and/or implement particular abstract data types. Moreover, other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like can practice the herein described computer-implemented methods. Distributed computing environments, in which remote processing devices linked through a communications network perform tasks, can also practice the illustrated aspects. However, stand-alone computers can practice one or more, if not all, aspects of the one or more embodiments described herein. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer-readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

As it is employed in the subject specification, the term "processor" can refer to any computing processing unit and/or device comprising, but not limited to, single-core processors; single-processors with software multi-thread execution capability; multi-core processors; multi-core processors with software multi-thread execution capability; multi-core processors with hardware multi-thread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A combination of computing processing units can implement a processor.

Herein, terms such as "store," "storage," "data store," data storage," "database," and any other information storage component relevant to operation and functionality of a component refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random access memory (RAM) (e.g., ferroelectric RAM (FeRAM). Volatile memory can include RAM, which can function as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synch link DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein include, without being limited to including, these and/or any other suitable types of memory.

The embodiments described herein include mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments are for purposes of illustration but are not exhaustive or limiting to the embodiments described herein. Many modifications and variations will be apparent to those of ordinary skill in the art without departing from the scope and spirit of the described embodiments. The terminology used herein best explains the principles of the embodiments, the practical application and/or technical improvement over technologies found in the marketplace, and/or to enable others of ordinary skill in the art to understand the embodiments described herein.

In an aspect, a system is described herein. As an example, FIG. 1 illustrates a system, according to one or more embodiments. The system comprises one or more sensor modules 102; a memory 104, and a processor 106. The processor 106 stores instructions in the memory 104 that, when executed, causes the processor 106 to: receive data comprising vehicle compartment features, occupant features and external environmental conditions from the one or more sensor modules (at step 103); determine a current setup of a seat belt and a current posture of an occupant based on the vehicle compartment features and the occupant features, respectively (at step 105); determine one or more critical features of the occupant based on at least one of the current posture of the occupant, the current setup of the seat belt, and the external environmental conditions (at step 107); determine a deviation from the current setup of the seat belt based on at least one of the one or more critical features of the occupant and the external environmental conditions (at step 109); and communicate a command to a seat belt adjustment unit for changing a current height of the seat belt to an optimal height according to the deviation (at step 111).

The vehicle compartment features comprises at least one of seat dimensions, seat shape, seat position, seat location, seat operating type, seat reclination positions, seat reclination angles, seat belt routing positions, seat belt routing locations, seat belt dimensions, seat belt buckles, and seat belt latch plate. The occupant features comprises at least one of one or more facial expressions, occupant size, occupant shape, occupant seating postures, occupant dimensions, and occupant weight. The external environmental conditions comprises information of at least one of a weather, a climate, a temperature, a wind, a storm, a tornado, a snow, a sleet, a rain, a road surface condition, and a traffic condition. The current setup of the seat belt comprises current seat belt routing position, current seat belt height position, and current seat belt routing location. The current posture of the occupant comprises a current facial expression, a current gesture, and a current activity of the occupant. The one or more critical features comprises one or more features for which the deviation is to be performed. The one or more critical features comprises at least one of a seat height deviation, a belt outlet deviation, and a recline deviation.

In one embodiment, the seat belt adjustment unit adjusts the current height of the seat belt to the optimal height based on the command/message received from the processor. The seat belt adjustment unit comprises one or more motors, one or more actuators and sliding mechanisms to adjust the current height of the seat belt. The seat belt adjustment unit may adjust the belt outlet height of the seat belt. The seat belt adjustment may comprise gear mechanism to adjust the height of the seat belt outlet. The seat belt adjustment may comprise hydraulic mechanisms to adjust the height of the seat belt outlet.

The one or more sensor modules 102 comprises one or more cameras, one or more infrared sensors, one or more proximity sensors, one or more load cells, one or more light detection and ranging (LIDAR) sensors, one or more temperature sensors, one or more humidity sensors, one or more pressure sensors, one or more wind sensors, one or more rainfall sensors, one or more radar sensors, one or more optical sensors, one or more remote sensing sensors, one or more embedded pavement sensors, one or more acceleration sensors, one or more recliner sensors, one or more limit switches, and one or more gyroscopic sensors. In one embodiment, the one or more sensor modules are mounted onto a vehicle. In another embodiment, the one or more sensor modules are mounted within a vehicle. In another embodiment, the one or more sensor modules are mounted external to a vehicle. In one embodiment, the processor 106 communicates with the one or more sensor modules 102 to perform the intended functions.

In one example, the one or more cameras of the one or more sensor modules 102 captures one or more images and/or one or more videos. The one or more images and/or one or more videos may be related to the interior of the vehicle. The one or more cameras capture the vehicle compartments. The vehicle compartments encompass scenes of at least one of the occupant seat, seat belt, seat height with respect to the vehicle, vehicle with respect to external environment (e.g., outside road, driver viewing the outside road via the front windshield, driver viewing the road surface condition, etc), facial expressions of the occupants, etc. The processor 106 receives the information (e.g., sensory information) from the one or more sensor modules 102 and analyses the information. The information herein is the one or more images and/or the one or more videos. The processor 106 performs image analysis. The processor 106 determines the presence of the occupant on the occupant seat. The processor 106 also determines the occupant features and the vehicle compartment features by performing image analysis. The processor 106 then determines a current setup of a seat belt and a current posture of an occupant based on the vehicle compartment features and the occupant features. The processor 106 determines the one or more critical features of the occupant based on at least one of the current posture of the occupant, the current setup of the seat belt, and the external environmental conditions. The processor 106 may also be capable of performing computer vision.

The processor 106 may also determine the external environment conditions (e.g., road surface condition, traffic condition, etc.) by performing image analysis of the one or more images and/or one or more videos. For example, the processor 106 determines that the road surface outside is having potholes. The processor 106 performs image analysis on the one or more images and/or one or more videos and focuses on the relevant portion of the one or more images and/or one or more videos. The processor 106 marks those relevant portions and compares them with prestored images (recorded within a repository) to determine the road surface condition. The processor 106 determines that the road surface is having potholes based on the percentile level of matching between the relevant portions of the captured images and the prestored images. The processor 106 then decides that the height of the seat has to be adjusted based on at least one of the occupant features, the external environmental conditions, and the vehicle compartment features. The processor 106 also determines a deviation (e.g., the height of the seat belt to be adjusted, the recline deviation, seat height deviation, etc.) when the height of the occupant seat is adjusted. In one embodiment, the deviation comprises at least one of a seat position deviation (e.g., height deviation, forward deviation, reverse deviation, etc.), a recline deviation, a seat belt height deviation, and a seat belt position deviation.

The processor 106 communicates the command/message to the seat belt adjustment unit in accordance with the deviation determined. The seat belt adjustment unit actuates the one or more actuators to adjust the height of the seat belt. The seat belt adjustment unit also adjusts the height of the seat belt outlet. In one embodiment, the seat belt adjustment unit adjusts the seat belt to pass through the centre of the shoulder and not to rest over the neck or hip of the occupant. The seat belt adjustment unit adjusts the height of the seat belt in order to achieve safety as per best industry standards and policies. The seat belt adjustment unit adjusts the height of the seat belt outlet in accordance with the command/message received from the processor 106. The height of the seat belt outlet may impact the routing position of the seat belt over the occupant, which in turn further impacts the visibility for the occupant (e.g., driver) outside the vehicle.

In one example, the one or more embedded pavement sensors of the one or more sensor modules 102 senses the road surface condition. The embedded pavement sensors are also capable of determining the weather outside. The processor 106 receives the information (e.g., sensory information) from the one or more sensor modules 102 and analyses the information. The information herein is the one or more images and/or the one or more videos. The processor 106 performs image analysis. The processor 106, in association with the one or more cameras, determines the presence of the occupant on the occupant seat. The processor 106 also determines the occupant features and the vehicle compartment features by performing image analysis. The processor 106 then determines a current setup of a seat belt and a current posture of an occupant based on the vehicle compartment features and the occupant features. The processor 106 determines the one or more critical features of the occupant based on at least one of the current posture of the occupant, the current setup of the seat belt, and the external environmental conditions.

The processor 106 may also determine the external environment conditions (e.g., road surface condition, traffic condition, etc.) from the one or more embedded pavement sensors of the one or more sensor modules 102. For example, the processor 106 determines that the road surface outside is having a slippery surface. The processor 106 performs image analysis on the one or more images and/or one or more videos and focuses on the relevant portion of the one or more images and/or one or more videos. The processor 106 marks those relevant portions and compares them with prestored images (recorded within a repository) to determine the road surface condition. The processor 106 determines that the road surface is having a slippery surface based on the percentile level of matching between the relevant portions of the captured images and the prestored images. The processor 106 then decides that the height of the seat has to be adjusted based on at least one of the occupant features, the external environmental conditions (e.g., slippery surface, fog, rain), and the vehicle compartment features. The processor 106 determines that the height of the seat and the height of the seat belt to be adjusted to provide better safety as well as visibility outside for providing convenient and safe mobility. The processor 106 also determines a deviation (e.g., the height of the seat belt to be adjusted, the recline deviation, seat height deviation, etc.) when the height of the occupant seat is adjusted.

The processor 106 communicates the command/message to the seat belt adjustment unit in accordance with the deviation determined. The seat belt adjustment unit actuates the one or more actuators to adjust the height of the seat belt. The seat belt adjustment unit also adjusts the height of the seat belt outlet in accordance with the command/message. The seat belt adjustment unit may adjust the height of an occupant seat alone to adjust the current height of the seat belt to the optimal height based on the command.

In one embodiment, the seat belt adjustment unit may adjust the current height of the seat belt to the optimal height utilizing one or more reference points. The seat belt comprises one or more reference points. The one or more reference points are adapted to determine stretching of the seat belt. The one or more reference points are further adapted to adjust the current height of the seat belt to the optimal height. The one or more sensor modules 102 determine a distance between the one or more reference points and communicate the command, via the processor 106, in accordance with the distance between the one or more reference points. The distance between the one or more reference points may be adapted to calculate the current height of the seat belt and adjust to the optimal height. The processor 106 communicates the command to the seat belt adjustment unit.

Figure 2:
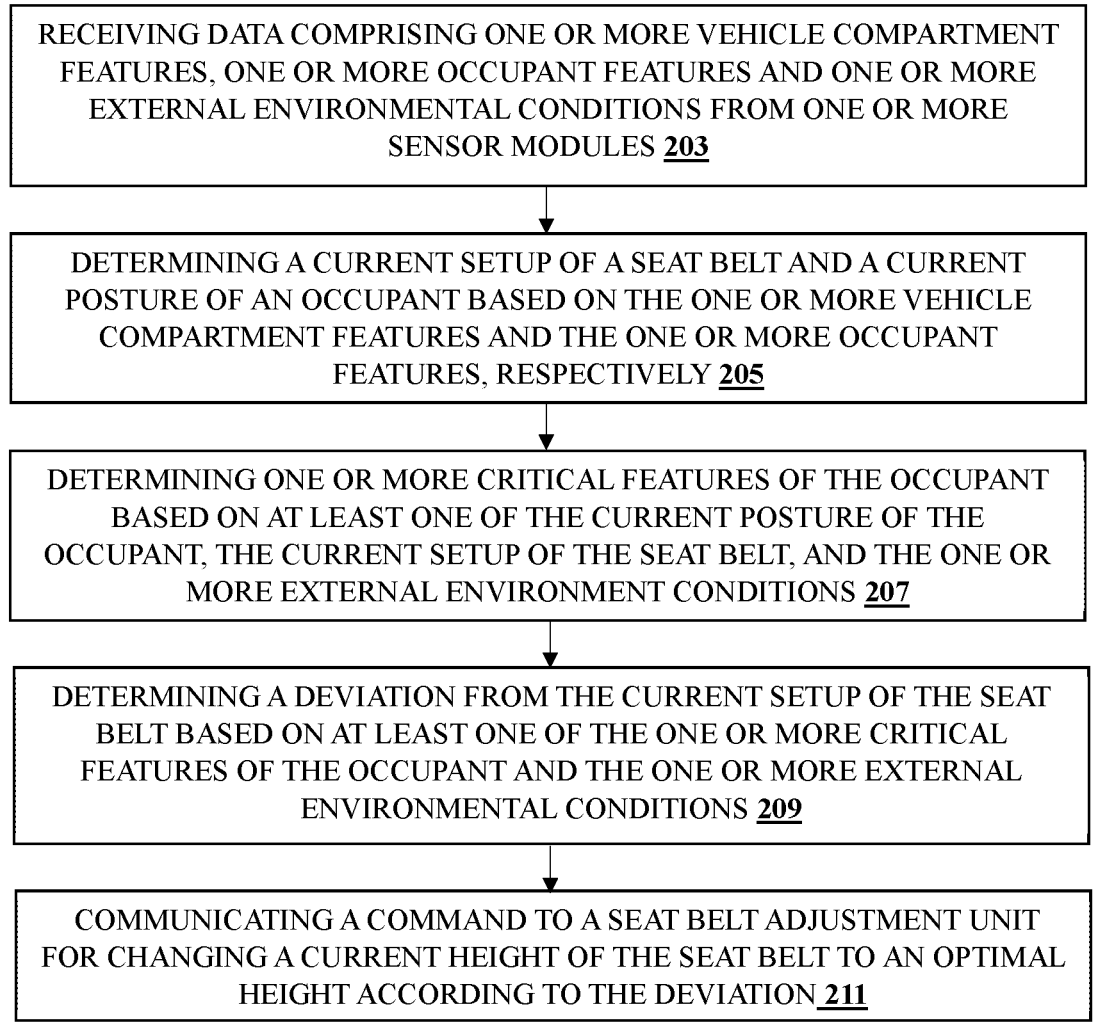
FIG. 2 illustrates a method, according to one or more embodiments.

In an aspect, a method is described herein. As an example, FIG. 2 illustrates a method, according to one or more embodiments. The method comprises the following technical steps: receiving data comprising vehicle compartment features, occupant features and external environmental conditions from one or more sensor modules (at step 203); determining a current setup of a seat belt and a current posture of an occupant based on the vehicle compartment features and the occupant features, respectively (at step 205); determining one or more critical features of the occupant based on at least one of the current posture of the occupant, the current setup of the seat belt, and the external environmental conditions (at step 207); determining a deviation from the current setup of the seat belt based on at least one of the one or more critical features of the occupant and the external environmental conditions (at step 209); and communicating a command to a seat belt adjustment unit for changing a current height of the seat belt to an optimal height according to the deviation (at step 211). The method further comprises: adjusting, via the seat belt adjustment unit, the current height of the seat belt to the optimal height based on the command. The method further comprises: communicating, by a processor, with the one or more sensor modules for receiving the sensory information. In one embodiment, the seat belt adjustment unit adjusts height of an occupant seat to adjust the current height of the seat belt to the optimal height based on the command.

The one or more sensor modules comprises one or more cameras, one or more infrared sensors, one or more proximity sensors, one or more load cells, one or more light detection and ranging (LIDAR) sensors, one or more temperature sensors, one or more humidity sensors, one or more pressure sensors, one or more wind sensors, one or more rainfall sensors, one or more radar sensors, one or more optical sensors, one or more remote sensing sensors, one or more embedded pavement sensors, one or more acceleration sensors, one or more recliner sensors, one or more limit switches, and one or more gyroscopic sensors. In one embodiment, the one or more sensor modules are mounted onto a vehicle. In another embodiment, the one or more sensor modules are mounted within a vehicle. In another embodiment, the one or more sensor modules are mounted external to a vehicle.

The vehicle compartment features comprises at least one of seat dimensions, seat shape, seat position, seat location, seat operating type, seat reclination positions, seat reclination angles, seat belt routing positions, seat belt routing locations, seat belt dimensions, seat belt buckles, and seat belt latch plate. The occupant features comprises at least one of one or more facial expressions, occupant size, occupant shape, occupant seating postures, occupant dimensions, and occupant weight. The external environmental conditions comprises information of at least one of a weather, a climate, a temperature, a wind, a storm, a tornado, a snow, a sleet, a rain, a road surface condition, and a traffic condition.

The current setup of the seat belt comprises current seat belt routing position, current seat belt height position, and current seat belt routing location. The current posture of the occupant comprises a current facial expression, a current gesture, and a current activity of the occupant. The one or more critical features comprises one or more features for which the deviation is to be performed. The one or more critical features further comprises at least one of a seat height deviation, a belt outlet deviation, and a recline deviation. In one embodiment, the deviation comprises at least one of a seat position deviation, a recline deviation, a seat belt height deviation, and a seat belt position deviation.

The seat belt comprises one or more reference points. The one or more reference points may be adapted to determine stretching of the seat belt. The one or more reference points may be further adapted to adjust the current height of the seat belt to the optimal height. In one embodiment, the method further comprises: determining, through the one or more sensor modules, a distance between the one or more reference points and communicating the command in accordance with the distance between the one or more reference points. The method further comprises: calculating the current height of the seat belt and adjusting to the optimal height based on the distance between the one or more reference points.

Figure 3:
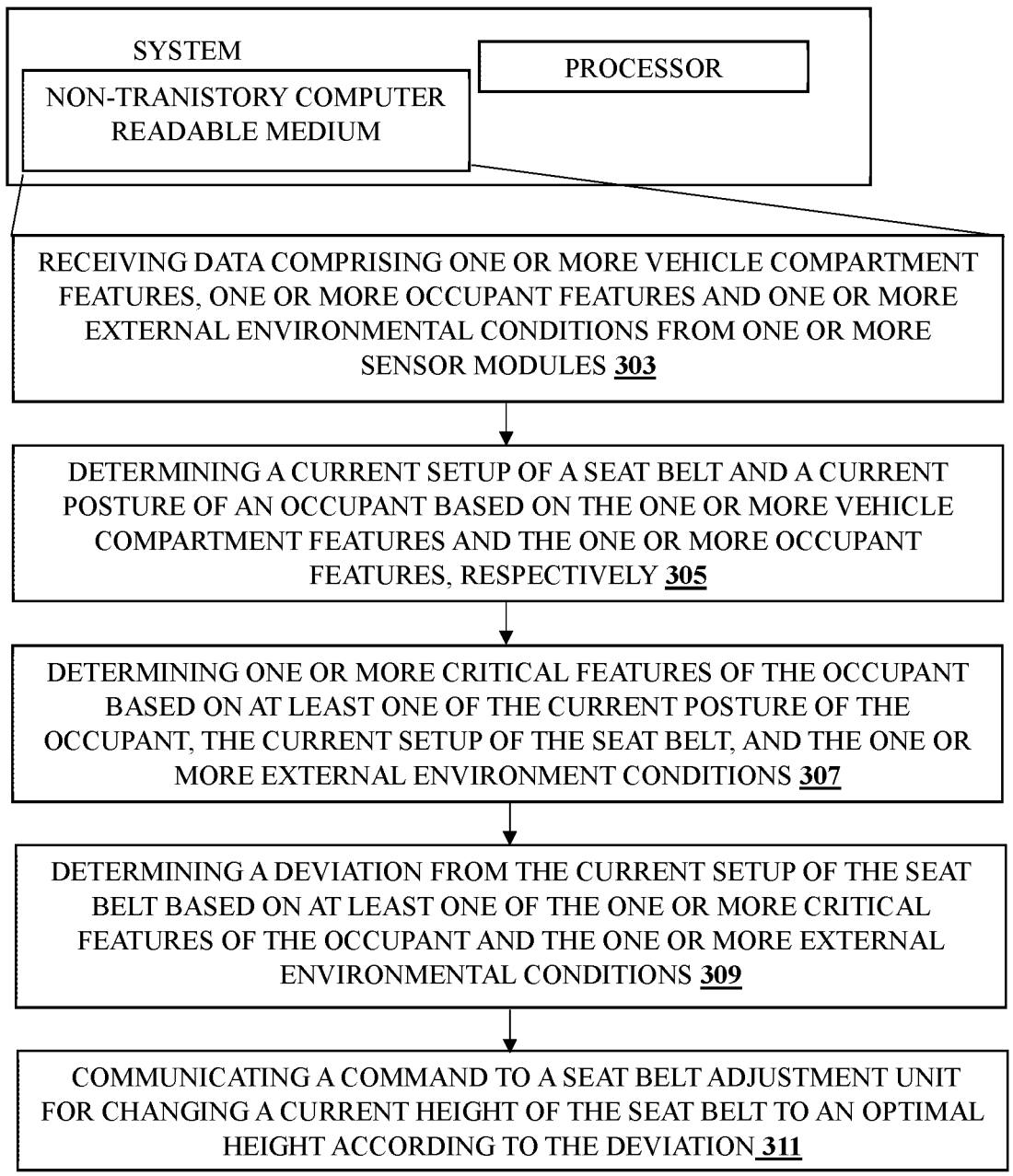
FIG. 3 illustrates a non-transitory computer-readable storage medium, according to one or more embodiments.

In another aspect, a non-transitory computer-readable storage medium is described. As an example, FIG. 3 illustrates a non-transitory computer-readable storage medium, according to one or more embodiments. The non-transitory computer-readable storage medium stores a sequence of instructions, which when executed by a processor causes: receiving data comprising vehicle compartment features, occupant features and external environmental conditions from one or more sensor modules (at step 303); determining a current setup of a seat belt and a current posture of an occupant based on the vehicle compartment features and the occupant features, respectively (at step 305); determining one or more critical features of the occupant based on at least one of the current posture of the occupant, the current setup of the seat belt, and the external environmental conditions (at step 307); determining a deviation from the current setup of the seat belt based on at least one of the one or more critical features of the occupant and the external environmental conditions (at step 309); and communicating a command to a seat belt adjustment unit for changing a current height of the seat belt to an optimal height according to the deviation (at step 311). The non-transitory computer-readable storage medium further causes: adjusting, via the seat belt adjustment unit, the current height of the seat belt to the optimal height based on the command. In one embodiment, the seat belt adjustment unit adjusts height of an occupant seat to adjust the current height of the seat belt to the optimal height based on the command. In one embodiment, the deviation comprises at least one of a seat position deviation, a recline deviation, a seat belt height deviation, and a seat belt position deviation.

In one embodiment, the non-transitory computer-readable storage medium further causes: communication, by a processor, with the one or more sensor modules. The one or more sensor modules comprises one or more cameras, one or more infrared sensors, one or more proximity sensors, one or more load cells, one or more light detection and ranging (LIDAR) sensors, one or more temperature sensors, one or more humidity sensors, one or more pressure sensors, one or more wind sensors, one or more rainfall sensors, one or more radar sensors, one or more optical sensors, one or more remote sensing sensors, one or more embedded pavement sensors, one or more acceleration sensors, one or more recliner sensors, one or more limit switches, and one or more gyroscopic sensors. In one embodiment, the one or more sensor modules are mounted onto a vehicle. In another embodiment, the one or more sensor modules are mounted within a vehicle. In another embodiment, the one or more sensor modules are mounted external to a vehicle.

The sensor modules are adapted to determine at least one of vehicle compartment features, occupant features, and external environmental conditions. The vehicle compartment features comprises at least one of seat dimensions, seat shape, seat position, seat location, seat operating type, seat reclination positions, seat reclination angles, seat belt routing positions, seat belt routing locations, seat belt dimensions, seat belt buckles, and seat belt latch plate. The occupant features comprises at least one of one or more facial expressions, occupant size, occupant shape, occupant seating postures, occupant dimensions, and occupant weight. The external environmental conditions comprises information of at least one of a weather, a climate, a temperature, a wind, a storm, a tornado, a snow, a sleet, a rain, a road surface condition, and a traffic condition.

The current setup of the seat belt comprises current seat belt routing position, current seat belt height position, and current seat belt routing location. The current posture of the occupant comprises a current facial expression, a current gesture, and a current activity of the occupant. In one embodiment, the one or more critical features comprises one or more features for which the deviation is to be performed. In another embodiment, the one or more critical features comprises at least one of a seat height deviation, a belt outlet deviation, and a recline deviation.

In one embodiment, the one or more reference points are adapted to adjust the current height of the seat belt to the optimal height. The seat belt comprises one or more reference points. In one embodiment, the one or more reference points are adapted to determine stretching of the seat belt. In one embodiment, the non-transitory computer-readable storage medium further causes: determining, through the one or more sensor modules, a distance between the one or more reference points and communicating the command in accordance with the distance between the one or more reference points. The non-transitory computer-readable storage medium further causes: calculating the current height of the seat belt and adjusting to the optimal height based on the distance between the one or more reference points.

Figure 4:
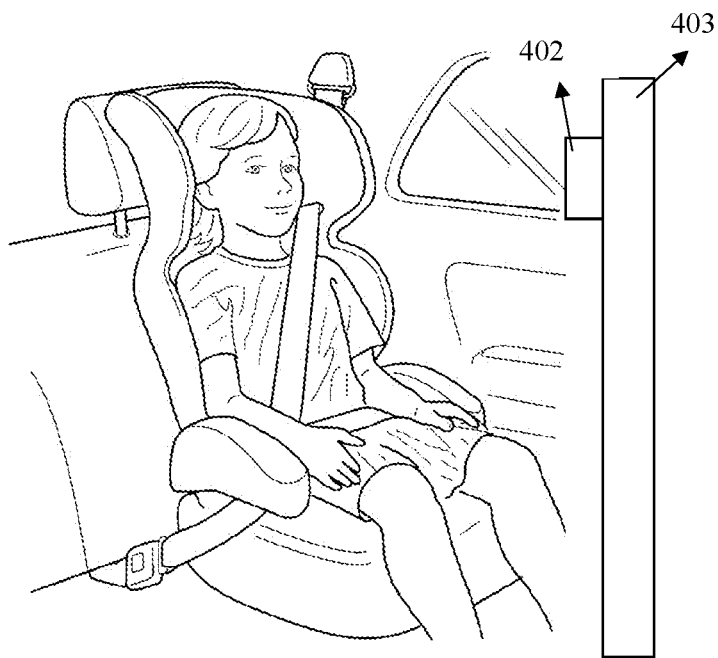
FIG. 4 illustrates one or more sensor modules detecting presence of an occupant in the occupant seat, according to one or more embodiments.

FIG. 4 illustrates one or more sensor modules detecting presence of an occupant in the occupant seat, according to one or more embodiments. The system comprises one or more sensor modules 402 in the vehicle. In an embodiment, the one or more sensor modules 402 may be mounted to the front seat 403 of the vehicle facing the occupant seat. The one or more sensor modules 402 may also be mounted on any portion within the interior of the vehicle facing the occupant seat. Examples include one of one or more infrared sensors, one or more Light Detection and Ranging (LIDAR) sensors, one or more cameras, and one or more ultrasonic sensors associated with the front seat 403 of the vehicle facing the one or more occupant seats.

The one or more sensor modules 402 can be mounted externally to the vehicle. Examples include one or more cameras. The one or more sensor modules 402 may be mounted on the occupant seat itself. Examples include one of one or more weight sensors, one or more seat belt tension sensors, one or more force sensors, and one or more proximity sensors.

Sensors such as one or more infrared sensors, one or more Light Detection and Ranging (LIDAR) sensors, and one or more ultrasonic sensors emit signals over their surroundings. The occupant seat may be within the surroundings of the signal emitted. When an occupant occupies the occupant seat, the occupant interrupts the signal. The sensors detect the presence of the occupant when the signal is interrupted (e.g., there is a delay in the reception of the signal).

Sensors such as weights sensors may be associated with the bottom of the occupant seat. When the occupant sits on the occupant seat, the weight sensor senses the load and detects the presence of the occupant. Sensors such as force sensors, tension sensors, capacitive load cells, resistive load cells may be mounted on the seat belt. When the seat belt is routed, the seat belt stretches and therefore the sensors residing on the seat belt experience a change in the distance and based on the change in the distance, the sensors determine the presence of the occupant.

Figure 5:
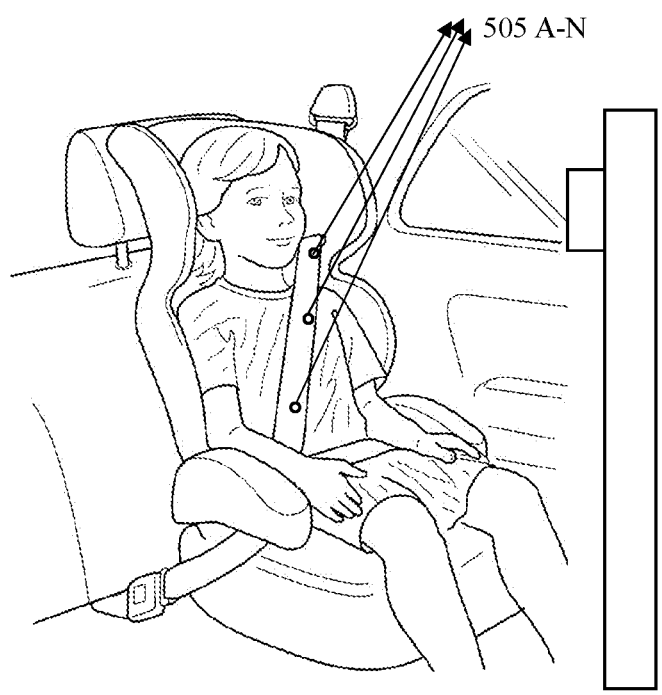
FIG. 5 illustrates the seat belt having one or more reference points for detecting presence of an occupant in the occupant seat, according to one or more embodiments.

FIG. 5 illustrates the seat belt having one or more reference points for detecting presence of an occupant in the occupant seat, according to one or more embodiments. The seat belt wound over the occupant in the occupant seat comprises the one or more reference points 505A-N. The one or more reference points 505A-N may be located at different portions of the seat belt. The distance between the one or more reference points 505A-N is constant initially. The seat belt when routed over the occupant gets stretched and therefore the distance between the one or more reference points 505A-N gets varied.

The sensor module comprising the one or more cameras may capture the one or more images of the occupant seat along with the seat belt. The processor monitors the distance between the one or more reference points 505A-N. The processor, in association with the artificial intelligence module, performs image analytics and determines the height of the seat belt based on the distance between the one or more reference points 505A-N in the seat belt when routed.

In an embodiment, the processor in association with the artificial intelligence module detects the presence of the occupant based on the distance between the one or more reference points 505A-N in the seat belt. For example, when there is no occupant on the occupant seat, the seat belt is not stretched and therefore the distance between the one or more reference points 505A-N in the seat belt do not vary. In this case, the processor in association with the artificial intelligence module determines that there is no occupant on the occupant seat. In another example, when there is an occupant on the occupant seat, the seat belt is stretched and therefore the distance between the one or more reference points 505A-N in the seat belt vary. In this case, the processor in association with the artificial intelligence module determines that there is an occupant on the occupant seat. In an embodiment, the processor in association with the artificial intelligence module is capable of determining the presence of particular occupant X based on the distance between the one or more reference points 505A-N in the seat belt. The artificial intelligence module comprises a machine learning module that learns the distance between the or more reference points 505A-N for each occupant. The processor in association with the artificial intelligence module is capable of determining the presence of particular occupant X when the distance between the or more reference points 505A-N in the seat belt is the same as the distance as the occupant X. In addition to that, the processor in association with the artificial intelligence module recognizes a facial identity from the image to further confirm the occupant present on the occupant seat is X.

In an embodiment, the sensor module comprises the one or more ultrasonic sensors. The one or more ultrasonic sensors emit signals to its surroundings that hits the occupant seat and the seat belt. The signals upon contacting the one or more reference points 505A-N in the seat belt are reflected back to the sensor module. The sensor module then detects the presence of the occupant when the signal is received back by the receiver upon hitting the one or more reference points 505A-N in the seat belt.

Figure 6:
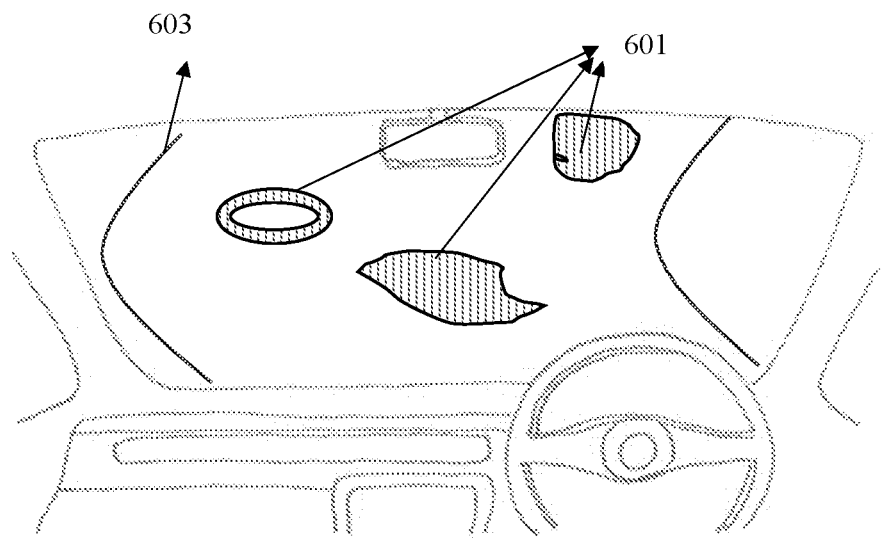
FIG. 6 illustrates one or more sensor modules determining road surface condition, according to one or more embodiments.

As an example, FIG. 6 illustrates one or more sensor modules determining road surface condition, according to one or more embodiments. The system comprises one or more sensor modules in the vehicle. In an embodiment, the one or more sensor modules may be mounted external to the vehicle. The one or more sensor modules may also be mounted on any portion within the interior of the vehicle facing the windshield and viewing the external environment through the windshield. The one or more sensor modules may also be mounted on the road 603 or pavement. Examples include at least one of one or more infrared sensors, one or more Light Detection and Ranging (LIDAR) sensors, one or more cameras, one or more temperature sensors, and one or more ultrasonic sensors.

The one or more sensor modules determines the external environment (e.g., road surface condition) as shown in FIG. 6. The road surface condition shown in FIG. 6 depicts having potholes 601. As the road 603 is full of potholes 601, the occupant may adjust the seat height and subsequently the seat belt height to adjust his/her visibility closer to the bonnet of the vehicle to see the potholes 601 and drive the vehicle safe and secure.

Figure 7:
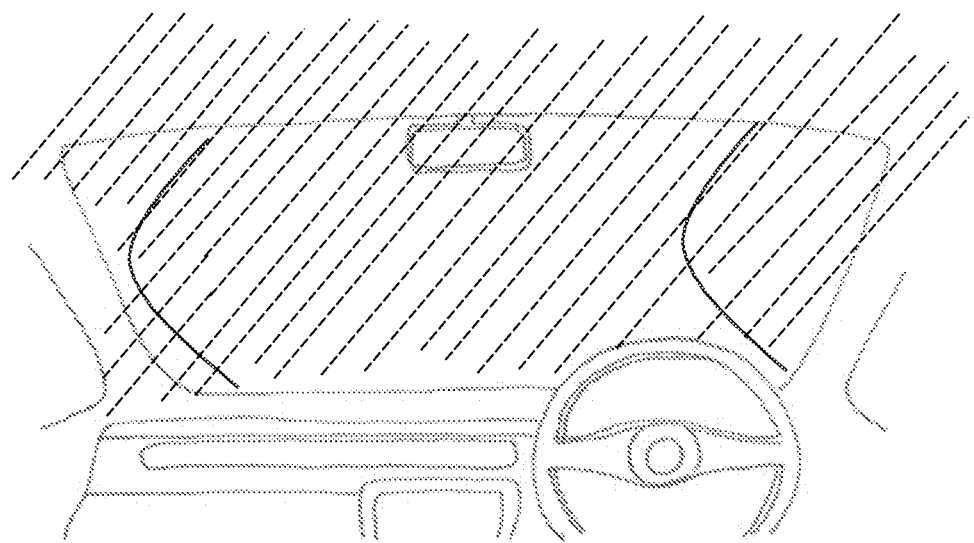
FIG. 7 illustrates one or more sensor modules determining external environment conditions, according to one or more embodiments.

As an example, FIG. 7 illustrates one or more sensor modules determining external environment conditions, according to one or more embodiments. The system comprises one or more sensor modules in the vehicle. In an embodiment, the one or more sensor modules may be mounted external to the vehicle. The one or more sensor modules may also be mounted on any portion within the interior of the vehicle facing the windshield and viewing the external environment through the windshield. The one or more sensor modules may also be mounted on the road surface or pavement. Examples include at least one of one or more cameras, one or more temperature sensors, etc.

The one or more sensor modules determines the external environment conditions (e.g., rain, fog, etc.) as shown in FIG. 7. The external environment condition shown in FIG. 7 depicts the external environment that is raining. As the external environment is raining, the occupant may adjust the seat height and subsequently the seat belt height to adjust his/her visibility closer to the bonnet of the vehicle to see the road surface with water and to drive the vehicle safe and secure.

Figure 8:
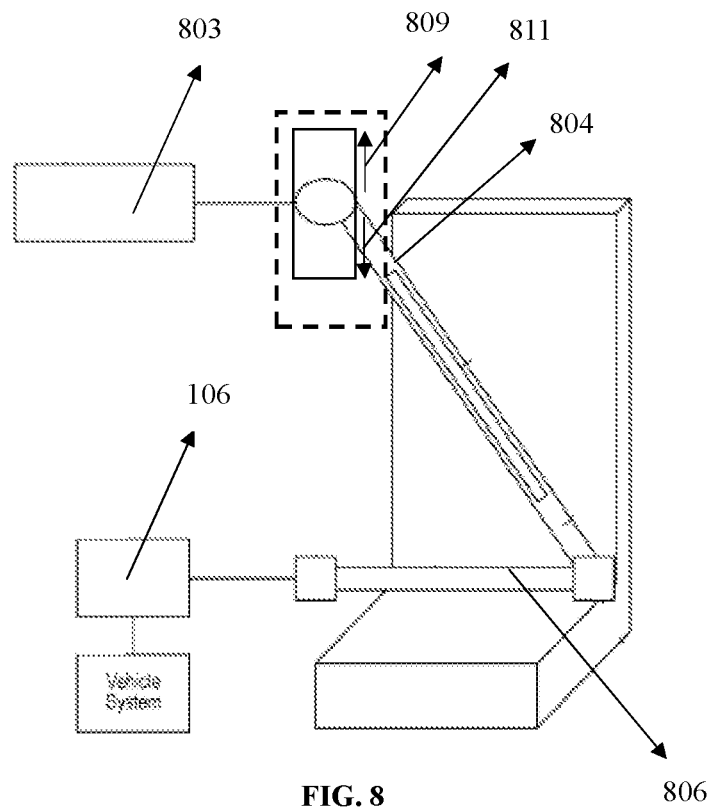
FIG. 8 illustrates a front plan view of an occupant seat equipped with a seat belt adjustment unit, according to one or more embodiments.

As an example, FIG. 8 illustrates a front plan view of an occupant seat equipped with a seat belt adjustment unit, according to one or more embodiments. The occupant seat comprises a seat belt. In an embodiment, the seat belt comprises a lap belt 806 in addition to the shoulder strap 804. The occupant seat is communicatively coupled to the seat belt adjustment unit 803. The seat belt adjustment unit 803 comprises motors that actuate and route the seat belt over the occupant through the predefined paths. The routing of the seat belt through the predefined paths enables automation as well as safe and secure routing of the seat belt.

The seat belt adjustment unit 803 may be communicatively coupled to the occupant seat, and the processor 106. The processor 106 may communicate commands to the seat belt adjustment unit 803 to activate automated routing and adjustment of the seat belt height. The processor 106 may also communicate commands to the electronic unit to render the user interface to enable manual adjustment of the seat belt height. The processor 106, in response to the user inputs received via the user interface of the electronic unit, adjusts the height of the seat belt. FIG. 8 further depicts that the height of the seat belt outlet can be adjusted in both directions 809 and 811.

Figure 9:
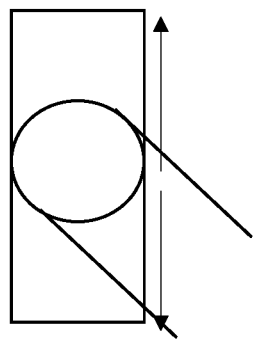
FIG. 9 illustrates an adjustment of a seat belt outlet, according to one or more embodiments.

As an example, FIG. 9 illustrates an adjustment of a seat belt outlet, according to one or more embodiments. The seat belt adjustment unit adjusts the seat belt outlet in both directions. The height of the seat belt outlet adjusts the seat belt height (i.e., the position of the seat belt over the occupant) to ensure safety. The seat belt adjustment unit automatically adjusts the seat belt height to pass over the center of the shoulder. In one embodiment, the seat belt adjustment unit automatically adjusts the height of the seat belt outlet to adjust the position of the seat belt over the occupant. In another embodiment, the seat belt adjustment unit automatically adjusts the height of the occupant seat to adjust the position of the seat belt over the occupant. In another embodiment, the seat belt adjustment unit automatically adjusts the reclining angle of the occupant seat to adjust the position of the seat belt over the occupant.

Figure 10:
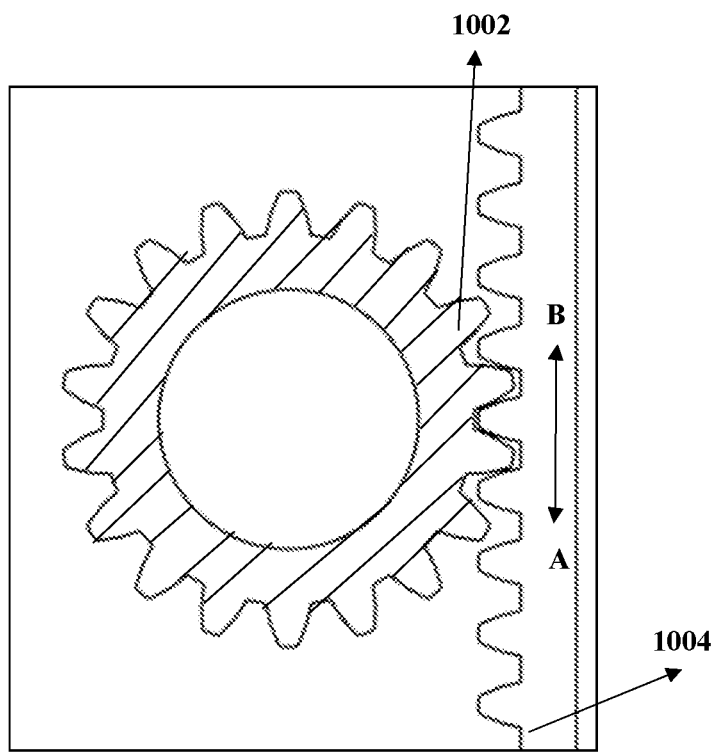
FIG. 10 illustrates a gear mechanism for an adjustment of height of a seat belt outlet, according to one or more embodiments.

As an example, FIG. 10 illustrates a gear mechanism for an adjustment of height of a seat belt outlet, according to one or more embodiments. The gear mechanism may comprise a rack 1004 and pinion 1002 positioned vertically for adjusting the height of the seat belt outlet. The pinion 1002 is a circular gear. The rack 1004 is a linear gear. The pinion 1002 engages with the rack 1004 to convert the rotational motion into linear motion (i.e., height of the seat belt outlet). The rack 1004 and pinion 1002 may be made of any material. The seat belt outlet is coupled to the pinion 1002 such that linear motion (i.e., height adjustment) is transferred to the seat belt outlet.

In one embodiment, the seat belt adjustment unit may employ a telescopic mechanism for adjusting the height of the seat belt outlet. In one embodiment, the seat belt adjustment unit may employ a hydraulic mechanism for adjusting the height of the seat belt outlet. In one embodiment, the seat belt adjustment unit may employ a linear actuator for adjusting the height of the seat belt outlet.

Figure 11:
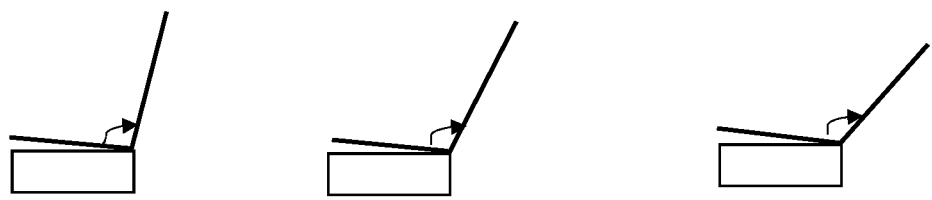
FIG. 11 illustrates reclining angles of an occupant seat, according to one or more embodiments.

FIG. 11 illustrates reclining angles of an occupant seat, according to one or more embodiments. The occupant seat may be reclined to different angles as shown in FIG. 11. The reclining angle of the occupant seat may also impact the seat belt positioning over the occupant.

The seat belt adjustment unit also monitors the reclining angle of the occupant seat. The seat belt adjustment unit may also automatically adjust the reclining angle of the occupant seat based on the command received from the processor.

Figure 12A:
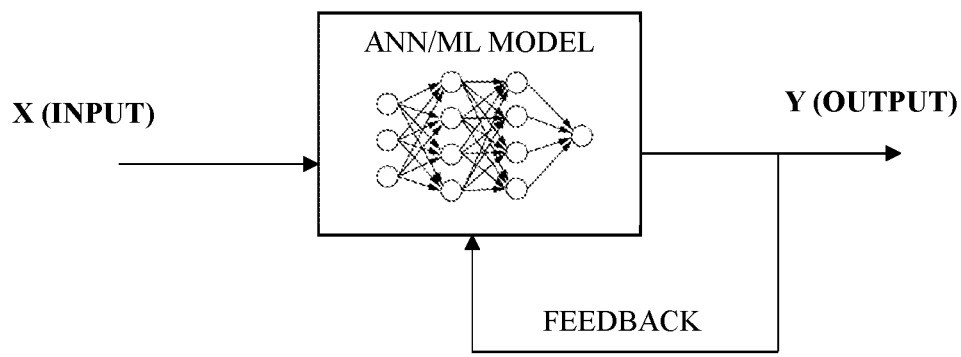
FIG. 12A shows a structure of the neural network/machine learning model with a feedback loop.

FIG. 12A shows a structure of the neural network/machine learning model with a feedback loop. Artificial neural networks (ANNs) model comprises an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed to the next layer of the network. A machine learning model or an ANN model may be trained on a set of data to take a request in the form of input data, make a prediction on that input data, and then provide a response. The model may learn from the data. Learning can be supervised learning and/or unsupervised learning and may be based on different scenarios and with different datasets. Supervised learning comprises logic using at least one of a decision tree, logistic regression, and support vector machines. Unsupervised learning comprises logic using at least one of a k-means clustering, a hierarchical clustering, a hidden Markov model, and an apriori algorithm. The output layer may predict or detect the first characteristics, the second characteristics, the tautness for the seat belt, the score, the convenience score, etc., based on the input data (explained above).

In an embodiment, ANNs may be a Deep-Neural Network (DNN), which is a multilayer tandem neural network comprising Artificial Neural Networks (ANN), Convolution Neural Networks (CNN) and Recurrent Neural Networks (RNN) that can recognize features from inputs, do an expert review, and perform actions that require predictions, creative thinking, and analytics. In an embodiment, ANNs may be Recurrent Neural Network (RNN), which is a type of Artificial Neural Networks (ANN), which uses sequential data or time series data. Deep learning algorithms are commonly used for ordinal or temporal problems, such as language translation, Natural Language Processing (NLP), speech recognition, and image recognition, etc. Like feedforward and convolutional neural networks (CNNs), recurrent neural networks utilize training data to learn. They are distinguished by their "memory" as they take information from prior input via a feedback loop to influence the current input and output. An output from the output layer in a neural network model is fed back to the model through the feedback. The variations of weights in the hidden layer(s) will be adjusted to fit the expected outputs better while training the model. This will allow the model to provide results with far fewer mistakes.

The neural network is featured with the feedback loop to adjust the system output dynamically as it learns from the new data. In machine learning, backpropagation and feedback loops are used to train an AI model and continuously improve it upon usage. As the incoming data that the model receives increases, there are more opportunities for the model to learn from the data. The feedback loops, or backpropagation algorithms, identify inconsistencies and feed the corrected information back into the model as an input.

Even though the AI/ML model is trained well, with large sets of labelled data and concepts, after a while, the models' performance may decline while adding new, unlabelled input due to many reasons which include, but not limited to, concept drift, recall precision degradation due to drifting away from true positives, and data drift over time. A feedback loop to the model keeps the AI results accurate and ensures that the model maintains its performance and improvement, even when new unlabelled data is assimilated. A feedback loop refers to the process by which an AI model's predicted output is reused to train new versions of the model.

Initially, when the AI/ML model is trained, a few labelled samples comprising both positive and negative examples of the concepts (for e.g., seat belt tautness) are used that are meant for the model to learn. Afterward, the model is tested using unlabelled data. By using, for example, deep learning and neural networks, the model can then make predictions on whether the desired concept/s (for e.g., tautness, convenience score, score, to be detected) are in unlabelled images. Each image is given a probability score where higher scores represent a higher level of confidence in the models' predictions. Where a model gives an image a high probability score, it is auto labelled with the predicted concept. However, in the cases where the model returns a low probability score, this input may be sent to a controller (may be a human moderator) which verifies and, as necessary, corrects the result. The human moderator may be used only in exceptional cases. The feedback loop feeds labelled data, auto-labelled or controller-verified, back to the model dynamically and is used as training data so that the system can improve its predictions in real-time and dynamically.

Figure 12B:
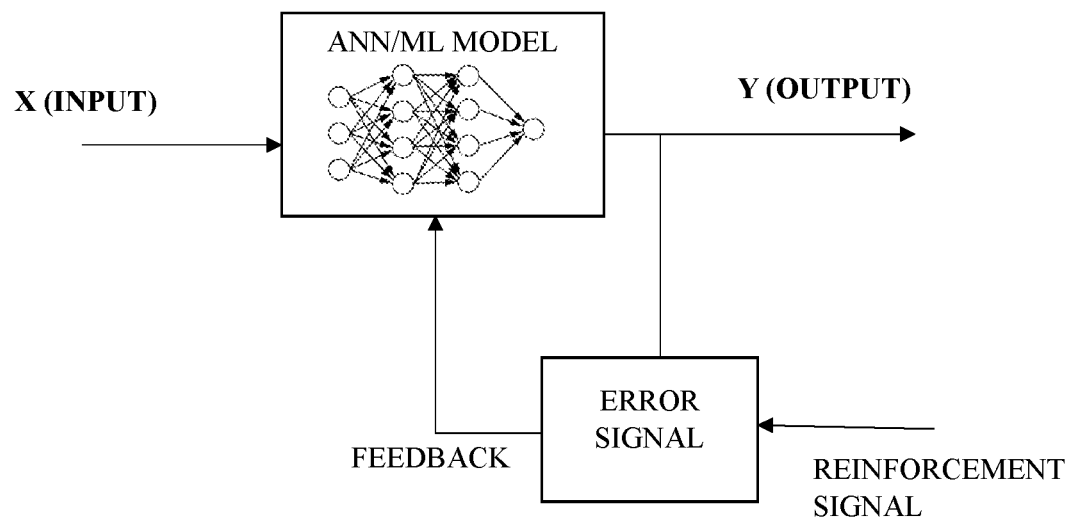
FIG. 12B shows a structure of the neural network/machine learning model with reinforcement learning.

FIG. 12B shows a structure of the neural network/machine learning model with reinforcement learning. The network receives feedback from authorized networked environments. Though the system is similar to supervised learning, the feedback obtained in this case is evaluative not instructive, which means there is no teacher as in supervised learning. After receiving the feedback, the network performs adjustments of the weights to get better predictions in the future. Machine learning techniques, like deep learning, allow models to take labeled training data and learn to recognize those concepts in subsequent data and images. The model may be fed with new data for testing, hence by feeding the model with data it has already predicted over, the training gets reinforced. If the machine learning model has a feedback loop, the learning is further reinforced with a reward for each true positive of the output of the system. Feedback loops ensure that AI results do not stagnate. By incorporating a feedback loop, the model output keeps improving dynamically and over usage/time.

In an embodiment, the system further comprises a cyber security module wherein the cyber security module comprises an information security management module providing isolation between the communication module and servers.

In an embodiment, the information security management module is operable to: receive data from the communication module, exchange a security key at a start of the communication between the communication module and the server, receive the security key from the server, authenticate an identity of the server by verifying the security key, analyse the security key for a potential cyber security threat, negotiate an encryption key between the communication module and the server, encrypt the data, and transmit the encrypted data to the server when no cyber security threat is detected.

In an embodiment, the information security management module is operable to exchange a security key at a start of the communication between the communication module and the server, receive the security key from the server, authenticate an identity of the server by verifying the security key, analyse the security key for a potential cyber security threat, negotiate an encryption key between the system and the server, receive encrypted data from the server, decrypt the encrypted data, perform an integrity check of the decrypted data, and transmit the decrypted data to the communication module when no cyber security threat is detected.

In an embodiment, the system may comprise a cyber security module.

In one aspect, a secure communication management (SCM) computer device for providing secure data connections is provided. The SCM computer device includes a processor in communication with memory. The processor is programmed to receive, from a first device, a first data message. The first data message is in a standardized data format. The processor is also programmed to analyse the first data message for potential cyber security threats. If the determination is that the first data message does not contain a cyber security threat, the processor is further programmed to convert the first data message into a first data format associated with the vehicle environment and transmit the converted first data message to the vehicle system using a first communication protocol associated with the vehicle system.

According to an embodiment, secure authentication for data transmissions comprises, provisioning a hardware-based security engine (HSE) located in communications system, said HSE having been manufactured in a secure environment and certified in said secure environment as part of an approved network; performing asynchronous authentication, validation and encryption of data using said HSE, storing user permissions data and connection status data in an access control list used to define allowable data communications paths of said approved network, enabling communications of the communications system with other computing system subjects to said access control list, performing asynchronous validation and encryption of data using security engine including identifying a user device (UD) that incorporates credentials embodied in hardware using a hardware-based module provisioned with one or more security aspects for securing the system, wherein security aspects comprising said hardware-based module communicating with a user of said user device and said HSE.

Figure 13A:
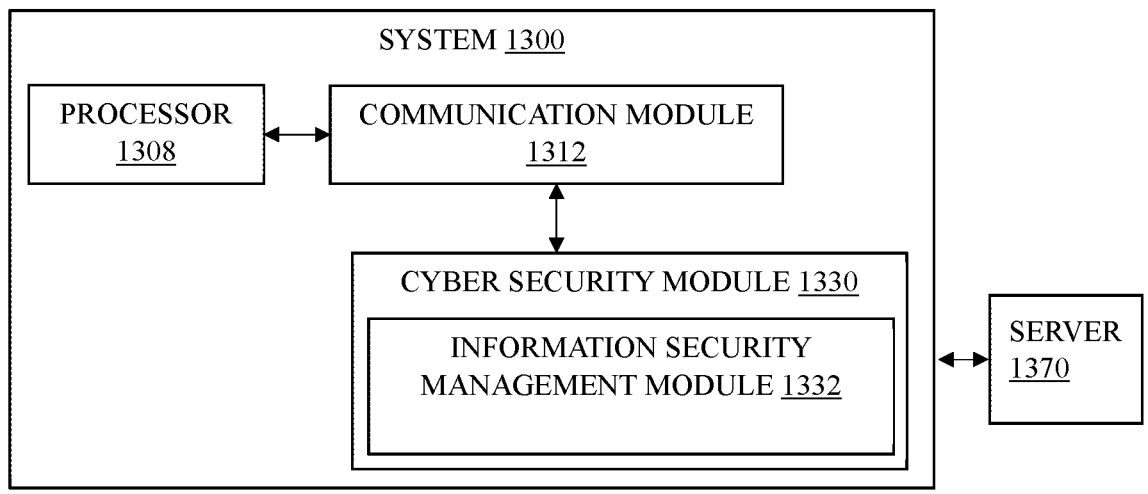
FIG. 13A shows a block diagram of the cyber security module in view of the system and server.

In an embodiment, FIG. 13A shows the block diagram of the cyber security module. The communication of data between the system 1300 and the server 1370 through the communication module 1312 is first verified by the information security management module 1332 before being transmitted from the system to the server or from the server to the system. The information security management module is operable to analyse the data for potential cyber security threats, to encrypt the data when no cyber security threat is detected, and to transmit the data encrypted to the system or the server.

Figure 13B:
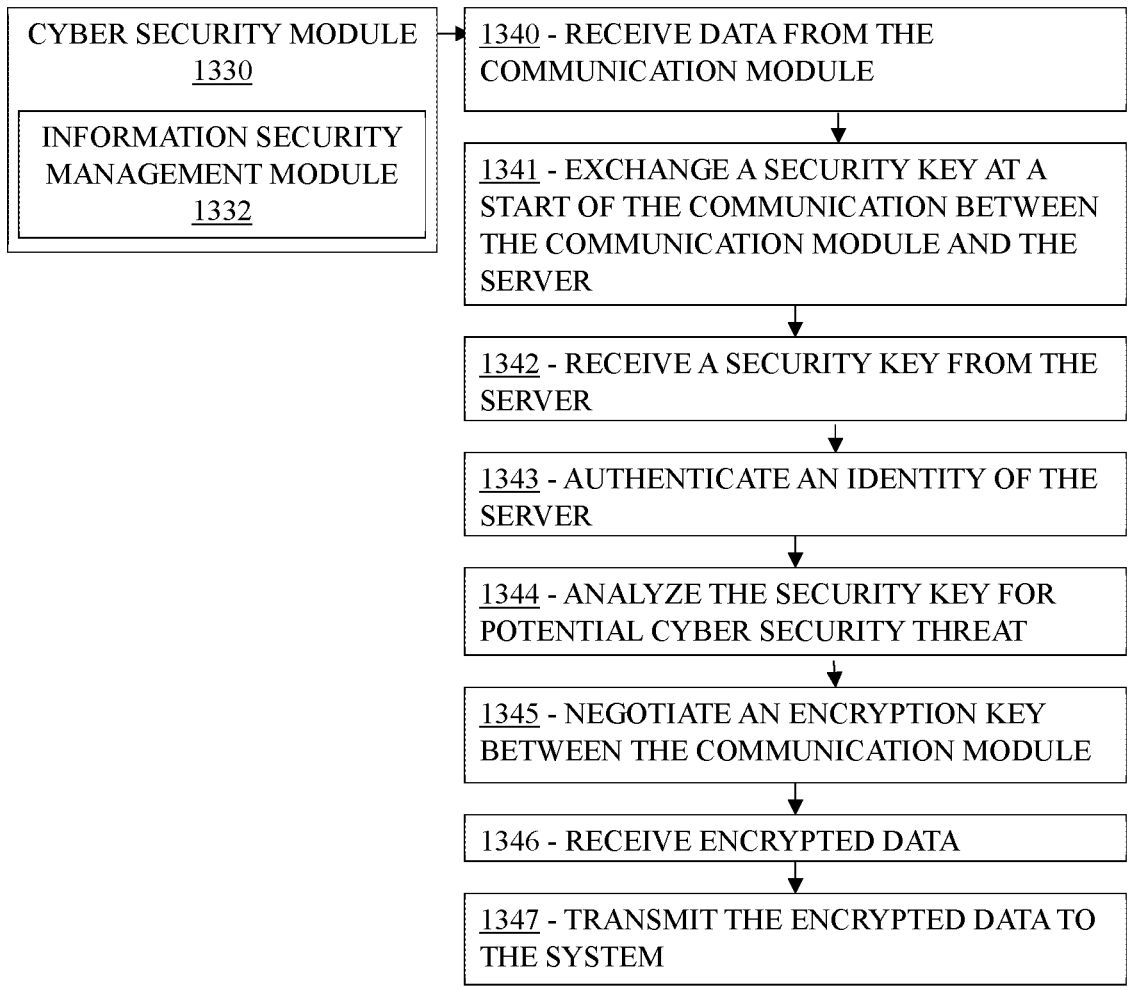
FIG. 13B shows an embodiment of the cyber security module.

In an embodiment, the cyber security module further comprises an information security management module providing isolation between the system and the server. FIG. 13B shows the flowchart of securing the data through the cyber security module 1330. At step 1340, the information security management module is operable to receive data from the communication module. At step 1341, the information security management module exchanges a security key at a start of the communication between the communication module and the server. At step 1342, the information security management module receives a security key from the server. At step 1343, the information security management module authenticates an identity of the server by verifying the security key. At step 1344, the information security management module analyses the security key for potential cyber security threats. At step 1345, the information security management module negotiates an encryption key between the communication module and the server. At step 1346, the information security management module receives the encrypted data. At step 1347, the information security management module transmits the encrypted data to the server when no cyber security threat is detected.

Figure 13C:
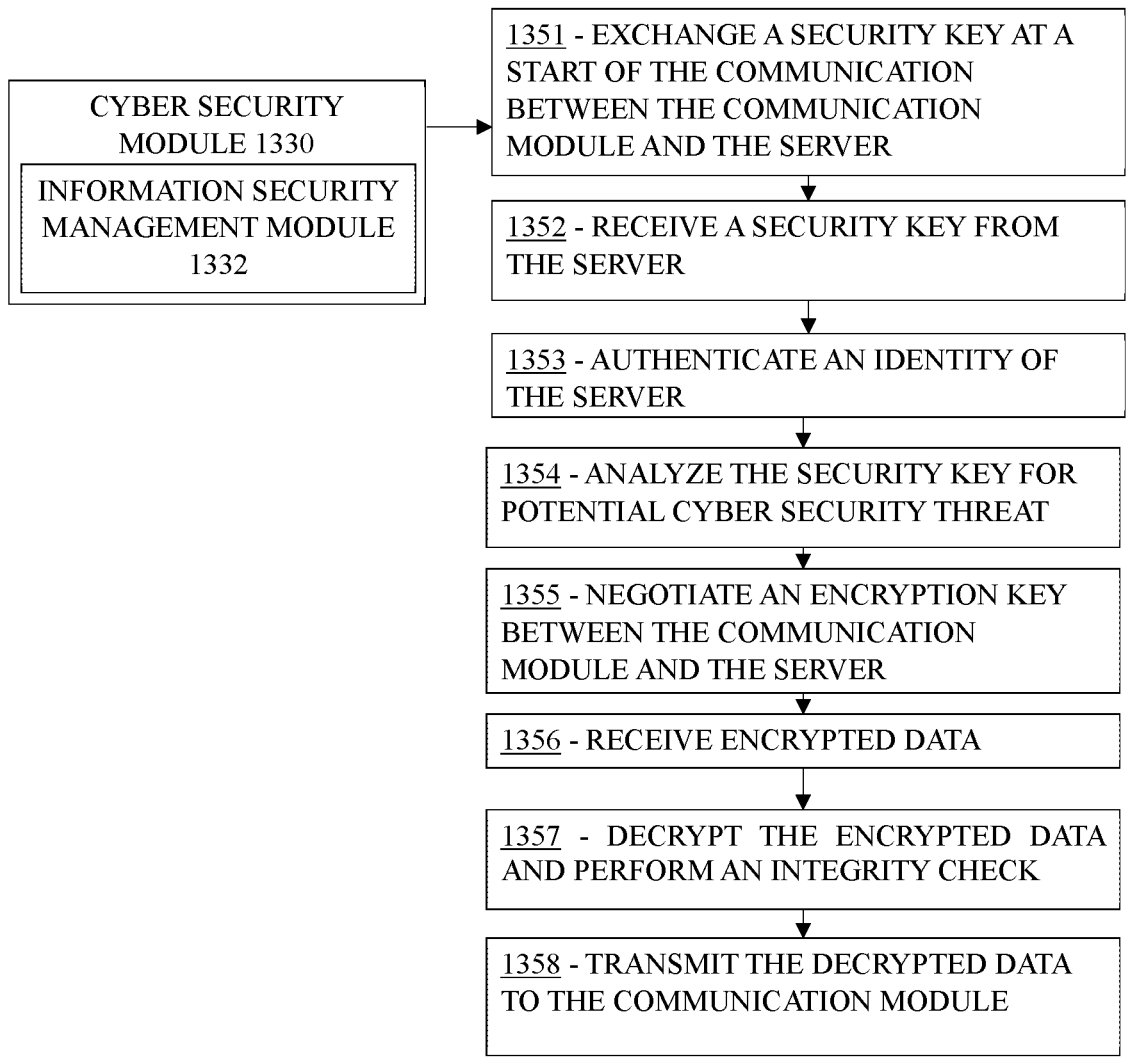
FIG. 13C shows another embodiment of the cyber security module.

In an embodiment, FIG. 13C shows the flowchart of securing the data through the cyber security module 1330. At step 1351, the information security management module is operable to: exchange a security key at a start of the communication between the communication module and the server. At step 1352, the information security management module receives a security key from the server. At step 1353, the information security management module authenticates an identity of the server by verifying the security key. At step 1354, the information security management module analyses the security key for potential cyber security threats. At step 1355, the information security management module negotiates an encryption key between the communication module and the server. At step 1356, the information security management module receives encrypted data. At step 1357, the information security management module decrypts the encrypted data, and performs an integrity check of the decrypted data. At step 1358, the information security management module transmits the decrypted data to the communication module when no cyber security threat is detected.

In an embodiment, the integrity check is a hash-signature verification using a Secure Hash Algorithm 256 (SHA256) or a similar method.

In an embodiment, the information security management module is configured to perform asynchronous authentication and validation of the communication between the communication module and the server.

In an embodiment, the information security management module is configured to raise an alarm if a cyber security threat is detected. In an embodiment, the information security management module is configured to discard the encrypted data received if the integrity check of the encrypted data fails.

In an embodiment, the information security management module is configured to check the integrity of the decrypted data by checking accuracy, consistency, and any possible data loss during the communication through the communication module.

In an embodiment, the server is physically isolated from the system through the information security management module. When the system communicates with the server as shown in FIG. 13A, identity authentication is first carried out on the system and the server. The system is responsible for communicating/exchanging a public key of the system and a signature of the public key with the server. The public key of the system and the signature of the public key are sent to the information security management module. The information security management module decrypts the signature and verifies whether the decrypted public key is consistent with the received original public key or not. If the decrypted public key is verified, the identity authentication is passed. Similarly, the system and the server carry out identity authentication on the information security management module. After the identity authentication is passed on to the information security management module, the two communication parties, the system, and the server, negotiate an encryption key and an integrity check key for data communication of the two communication parties through the authenticated asymmetric key. A session ID number is transmitted in the identity authentication process, so that the key needs to be bound with the session ID number; when the system sends data to the outside, the information security gateway receives the data through the communication module, performs integrity authentication on the data, then encrypts the data through a negotiated secret key, and finally transmits the data to the server through the communication module. When the information security management module receives data through the communication module, the data is decrypted first, integrity verification is carried out on the data after decryption, and if verification is passed, the data is sent out through the communication module; otherwise, the data is discarded.

In an embodiment, the identity authentication is realized by adopting an asymmetric key with a signature.

In an embodiment, the signature is realized by a pair of asymmetric keys which are trusted by the information security management module and the system, wherein the private key is used for signing the identities of the two communication parties, and the public key is used for verifying that the identities of the two communication parties are signed. Signing identity comprises a public and a private key pair. In other words, signing identity is referred to as the common name of the certificates which are installed in the user's machine.

In an embodiment, both communication parties need to authenticate their own identities through a pair of asymmetric keys, and a task in charge of communication with the information security management module of the system is identified by a unique pair of asymmetric keys.

In an embodiment, the dynamic negotiation key is encrypted by adopting an Rivest-Shamir-Adleman (RSA) encryption algorithm. RSA is a public-key cryptosystem that is widely used for secure data transmission. The negotiated keys include a data encryption key and a data integrity check key.

In an embodiment, the data encryption method is a Triple Data Encryption Algorithm (3DES) encryption algorithm. The integrity check algorithm is a Hash-based Message Authentication Code (HMAC-MD5-128) algorithm. When data is output, the integrity check calculation is carried out on the data, the calculated Message Authentication Code (MAC) value is added with the header of the value data message, then the data (including the MAC of the header) is encrypted by using a 3DES algorithm, the header information of a security layer is added after the data is encrypted, and then the data is sent to the next layer for processing. In an embodiment the next layer refers to a transport layer in the Transmission Control Protocol/Internet Protocol (TCP/IP) model.

The information security management module ensures the safety, reliability, and confidentiality of the communication between the system and the server through the identity authentication when the communication between the two communication parties starts the data encryption and the data integrity authentication. The method is particularly suitable for an embedded platform which has less resources and is not connected with a Public Key Infrastructure (PKI) system and can ensure that the safety of the data on the server cannot be compromised by a hacker attack under the condition of the Internet by ensuring the safety and reliability of the communication between the system and the server.

The embodiments described herein include mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

Other specific forms may embody the present invention without departing from its spirit or characteristics. The described embodiments are in all respects illustrative and not restrictive. Therefore, the appended claims rather than the description herein indicate the scope of the invention. All variations which come within the meaning and range of equivalency of the claims are within their scope.

What is claimed is:
1. A system comprising:
one or more sensor modules;
a seat belt adjustment unit;
a memory; and
a processor storing instructions in the memory that, when executed, causes the processor to:

receive data from the one or more sensor modules, wherein the data comprises vehicle compartment features, occupant features and external environmental conditions;

determine a current setup of a seat belt and a current posture of an occupant based on the vehicle compartment features and the occupant features, respectively, wherein the seat belt comprises one or more reference points;

determine one or more critical features of the occupant based on at least one of the current posture of the occupant, the current setup of the seat belt, and the external environmental conditions;

determine a deviation of the seat belt from the current setup of the seat belt based on at least one of the one or more critical features of the occupant and the external environmental conditions; and communicate a command to the seat belt adjustment unit for changing a current height of the seat belt to an optimal height according to the deviation, wherein the current height of the seat belt is adjusted to the optimal height using the one or more reference points.

2. The system of claim 1, wherein the vehicle compartment features comprise at least one of seat dimensions, seat shape, seat position, seat location, seat operating type, seat reclination positions, seat reclination angles, seat belt routing positions, seat belt routing locations, seat belt dimensions, seat belt buckles, and seat belt latch plate.

3. The system of claim 1, wherein the occupant features comprises at least one of one or more facial expressions, occupant size, occupant shape, occupant seating postures, occupant dimensions, and occupant weight.

4. The system of claim 1, wherein the external environmental conditions comprise information of at least one of weather, climate, temperature, wind, storm, tornado, snow, sleet, rain, road surface condition, and traffic condition.

5. The system of claim 1, wherein the current setup of the seat belt comprises current seat belt routing position, current seat belt height position, and current seat belt routing location.

6. The system of claim 5, wherein the current posture of the occupant comprises a current facial expression, a current gesture, and a current activity of the occupant.

7. The system of claim 1, wherein the one or more critical features comprises one or more features for which the deviation is to be performed.

8. The system of claim 7, wherein the one or more critical features comprises at least one of a seat height deviation, a belt outlet deviation, and a recline deviation.

9. The system of claim 1, wherein the one or more sensor modules determine a distance between the one or more reference points and communicate the command in accordance with the distance between the one or more reference points.

10. The system of claim 9, wherein the distance between the one or more reference points are adapted to calculate the current height of the seat belt and adjust to the optimal height.

11. The system of claim 1, wherein the deviation comprises at least one of a seat position deviation, a recline deviation, a seat belt height deviation, and a seat belt position deviation.

12. A method comprising:

receiving data from one or more sensor modules, wherein the data comprises vehicle compartment features, occupant features and external environmental conditions;

determining a current setup of a seat belt and a current posture of an occupant based on the vehicle compartment features and the occupant features, respectively, wherein the seat belt comprises one or more reference points;

determining one or more critical features of the occupant based on at least one of the current posture of the occupant, the current setup of the seat belt, and the external environmental conditions;

determining a deviation of the seat belt from the current setup of the seat belt based on at least one of the one or more critical features of the occupant and the external environmental conditions; and communicating a command to a seat belt adjustment unit for changing a current height of the seat belt to an optimal height according to the deviation, wherein the current height of the seat belt is adjusted to the optimal height using the one or more reference points.

13. The method of claim 12, wherein the one or more sensor modules comprises one or more cameras, one or more infrared sensors, one or more proximity sensors, one or more load cells, one or more light detection and ranging (LIDAR) sensors, one or more temperature sensors, one or more humidity sensors, one or more pressure sensors, one or more wind sensors, one or more rainfall sensors, one or more radar sensors, one or more optical sensors, one or more remote sensing sensors, one or more embedded pavement sensors, one or more acceleration sensors, one or more recliner sensors, one or more limit switches, and one or more gyroscopic sensors.

14. The method of claim 12, further comprising: adjusting height of an occupant seat, via the seat belt adjustment unit, to adjust the current height of the seat belt to the optimal height based on the command.

15. A non-transitory computer-readable storage medium storing a sequence of instructions, which when executed by a processor, causes:

receiving data from one or more sensor modules, wherein the data comprises vehicle compartment features, occupant features and external environmental conditions;

determining a current setup of a seat belt and a current posture of an occupant based on the vehicle compartment features and the occupant features, respectively, wherein the seat belt comprises one or more reference points;

determining one or more critical features of the occupant based on at least one of the current posture of the occupant, the current setup of the seat belt, and the external environmental conditions;

determining a deviation of the seat belt from the current setup of the seat belt based on at least one of the one or more critical features of the occupant and the external environmental conditions; and communicating a command to a seat belt adjustment unit for changing a current height of the seat belt to an optimal height according to the deviation, wherein the current height of the seat belt is adjusted to the optimal height using the one or more reference points.

16. The non-transitory computer-readable storage medium of claim 15, further causes: adjusting, through the seat belt adjustment unit, the current height of the seat belt to the optimal height based on the command.

17. The non-transitory computer-readable storage medium of claim 15, wherein the one or more sensor modules are mounted onto a vehicle.

18. The non-transitory computer-readable storage medium of claim 15, wherein the one or more sensor modules are mounted within a vehicle.

\* \* \* \* \*